United States Patent
Fujikami et al.

(10) Patent No.: US 8,102,776 B2
(45) Date of Patent: Jan. 24, 2012

(54) METHODS AND APPARATUS FOR GENERATING SIMULATED NETWORK TRAFFIC

(75) Inventors: Craig Fujikami, Honolulu, HI (US); William T. Hatley, San Jose, CA (US); Jocelyn Kunimitsu, Honolulu, HI (US)

(73) Assignee: Spirent Communications, Inc., Sunnyvale, CA (US)

( * ) Notice: Subject to any disclaimer, the term of this patent is extended or adjusted under 35 U.S.C. 154(b) by 242 days.

(21) Appl. No.: 11/899,358

(22) Filed: Sep. 5, 2007

(65) Prior Publication Data

US 2009/0059804 A1    Mar. 5, 2009

(51) Int. Cl.
*H04L 12/26* (2006.01)
*H04L 12/56* (2006.01)

(52) U.S. Cl. ......................... 370/241; 370/394
(58) Field of Classification Search .................. 370/241, 370/241.1, 248, 252, 389, 242, 244, 394; 702/108; 709/223, 224
See application file for complete search history.

(56) References Cited

U.S. PATENT DOCUMENTS

| | | | |
|---|---|---|---|
| 6,414,942 B1 | 7/2002 | Ito et al. | |
| 7,805,287 B1 * | 9/2010 | Jones | 703/13 |
| 2003/0198246 A1 * | 10/2003 | Lifshitz et al. | 370/445 |
| 2007/0008897 A1 * | 1/2007 | Denton et al. | 370/250 |
| 2007/0067130 A1 * | 3/2007 | Toda et al. | 702/108 |
| 2008/0225841 A1 * | 9/2008 | Conway et al. | 370/389 |
| 2009/0116387 A1 * | 5/2009 | Takai | 370/235 |
| 2010/0124171 A1 * | 5/2010 | Yoneyama et al. | 370/242 |

FOREIGN PATENT DOCUMENTS

| | | |
|---|---|---|
| EP | 0 895 375 A | 2/1999 |
| EP | 1 443 703 A | 8/2004 |
| WO | WO2007004558 A1 * | 1/2007 |

OTHER PUBLICATIONS

International Search Report from International Patent Application PCT/US2008/010377 dated Feb. 26, 2009.
Keiser, G. et al. "Test traffic generation equipment and algorithms for evaluating ATM networks" Computer Communications, Elsevier Science Publishers BV, Amsterdam, NL, vol. 19, No. 12, Oct. 1, 1996, pp. 962-971.

* cited by examiner

*Primary Examiner* — Aung S Moe
*Assistant Examiner* — Feben M Haile
(74) *Attorney, Agent, or Firm* — Kenta Suzue; Haynes Beffel & Wolfeld LLP

(57) ABSTRACT

Embodiments of the invention relate to generating simulated network traffic. In some embodiments, simulated network traffic may be generated using a specification of a sequence of frames to be transmitted from the network testing device. The specification may specify at least two frames including a first frame and a second frame. The specification may further specify a first interframe gap associated with the first frame and a second interframe gap, having a different length from the first interframe gap, associated with the second frame.

In some embodiments, the specification may specify an interframe gap for each frame in the sequence of frames. This information may be used to determine the relative transmit time of each frame to be transmitted. Because the specification identifies an interframe gap for each frame in the sequence, in some embodiments, multi-frame burst network traffic may be generated.

26 Claims, 17 Drawing Sheets

| Repeat Count | Frame Identifier | Interframe Gap | |
|---|---|---|---|
| 2 | 1 | 12 | —501 |
| 1 | 1 | 240 | —503 |
| 2 | 1 | 12 | —505 |
| 1 | 1 | 240 | —507 |

FIG. 5

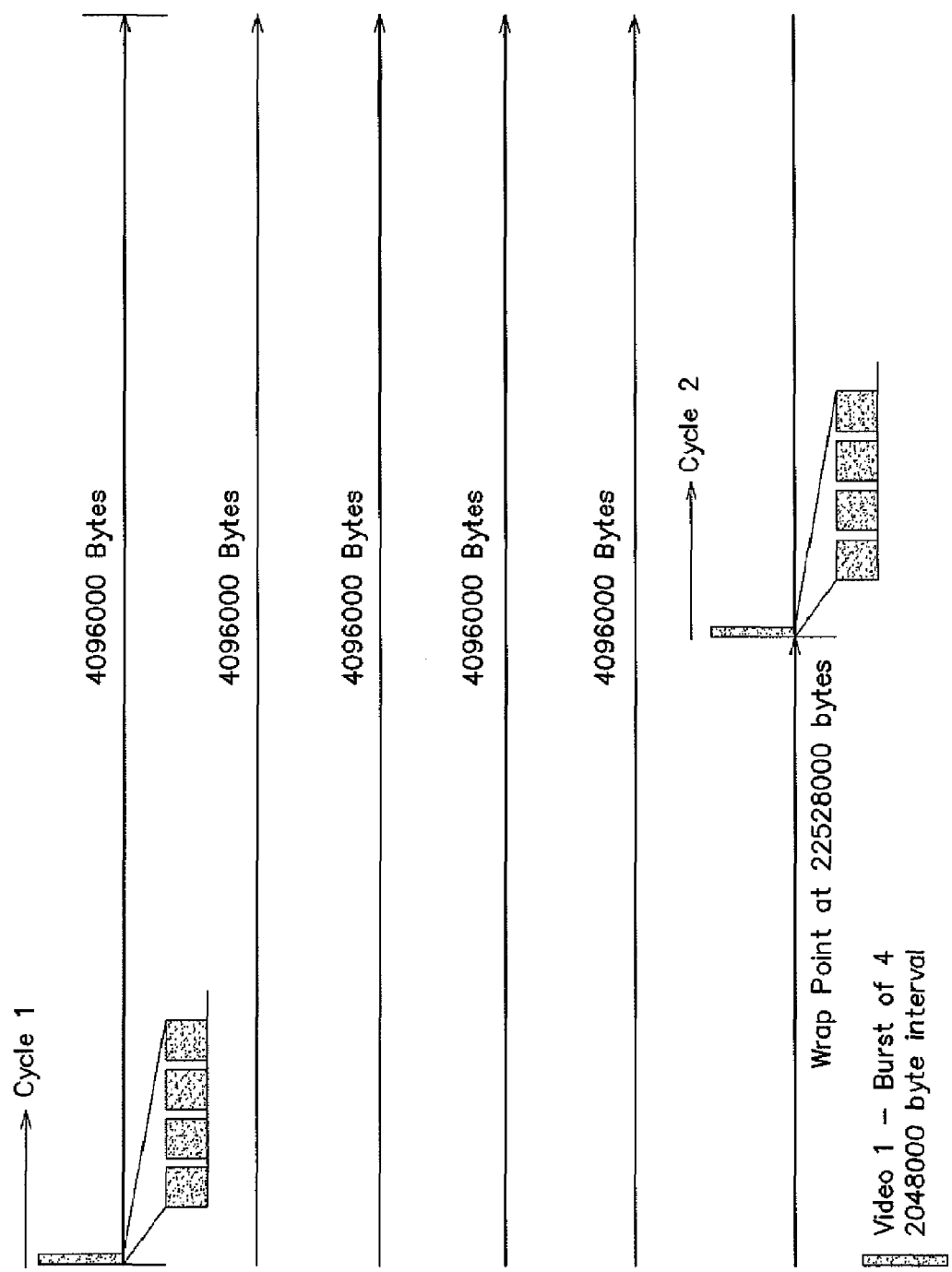

METHODS AND APPARATUS FOR GENERATING SIMULATED NETWORK TRAFFIC

FIELD OF THE INVENTION

The invention relates to network testing devices.

DESCRIPTION OF RELATED ART

A computer network comprises multiple interconnected computer systems. In many computer networks, network devices, such as routers, switches, and hubs, are used to couple network devices and route transmitted data from its source to its destination(s). The use of such computer networks is widespread, and one of the challenges faced by the operators of these networks is protecting the network against failures and performance degradations. These failures and performance degradations can occur for any of a number of reasons, including, for example, network devices receiving network traffic at a faster rate than they are able to process it.

To test the reliability of networks and network devices, operators of the networks and manufacturers of network devices frequently use testing equipment that generates simulated network traffic, transmits such traffic over the network, and analyzes the response of the network device(s) on the network to determine how effectively the network device(s) can process the simulated network traffic.

SUMMARY

One embodiment is directed to a method of processing information at a network testing device. The method comprises acts of: receiving, at the network testing device, a specification of a sequence of frames to be transmitted from the network testing device, wherein the specification specifies at least two frames including a first frame and a second frame, and wherein the specification specifies a first interframe gap associated with the first frame and a second interframe gap, having a different length from the first interframe gap, associated with the second frame; and storing the specification.

Another embodiments is directed to a method of generating simulated network traffic at a network testing device. The method comprises acts of: generating, based on a specification of a sequence of frames to be transmitted, a first frame; determining, based on the specification, a transmit time for the first frame; transmitting the frame at the transmit time for the first frame; in response to transmitting the first frame, determining, based on the specification, a transmit time for a next frame in the sequence of frames to be transmitted after the first frame; generating, based on the specification, the next frame; and transmitting the next frame at the transmit time for the next frame.

A further embodiment is directed to a device comprising: a memory that stores a specification of a sequence of frames to be transmitted from the device, wherein the specification specifies at least two frames including a first frame and a second frame, and wherein the specification specifies for each of a plurality of frames in the sequence, a value indicative of a relative transmit time of a next frame in the sequence.

Another embodiment is directed to a method of transmitting multi-frame burst traffic from a network testing device. The method comprises an act of: transmitting, from the network testing device to the network device under test, a series of multi-frame bursts, wherein the frames in each of the multi-frame bursts are separated by intra-burst intervals, wherein multi-frame bursts in the series of multi-frame bursts are separated by a burst repetition interval, and wherein the intra-burst interval is different in length from the burst repetition interval.

BRIEF DESCRIPTION OF THE DRAWINGS

FIG. 5 is a block diagram of an illustrative frame sequence table for generating simulated traffic from a multi-frame burst traffic source, in accordance with one embodiment;

FIGS. 9A-9F are diagrams illustrating the construction of a linked list of a sequence of frames to be transmitted to simulate network traffic from a set of traffic sources, in accordance with one embodiment;

DETAILED DESCRIPTION

Applicants have appreciated that, when using network test equipment to generate simulated network traffic, it is desirable to generate network traffic that closely simulates the actual network traffic that network or network device(s) under test are expected to receive when operating in a live network. In this way, the response of the network or network device(s) under test to the simulated network traffic may more accurately indicate how the network or network device(s) will respond to real network traffic.

In prior art network test systems, relatively simple traffic sources that have a fixed transmit rate (e.g., in packets per second or bytes per second) are generated. That is, for example, prior art systems generate network traffic by simulating multiple fixed-rate traffic sources. Further, in these systems, the transmit rate of each of the traffic sources must be an integer multiple of the lowest rate transmit source.

Figure 1:
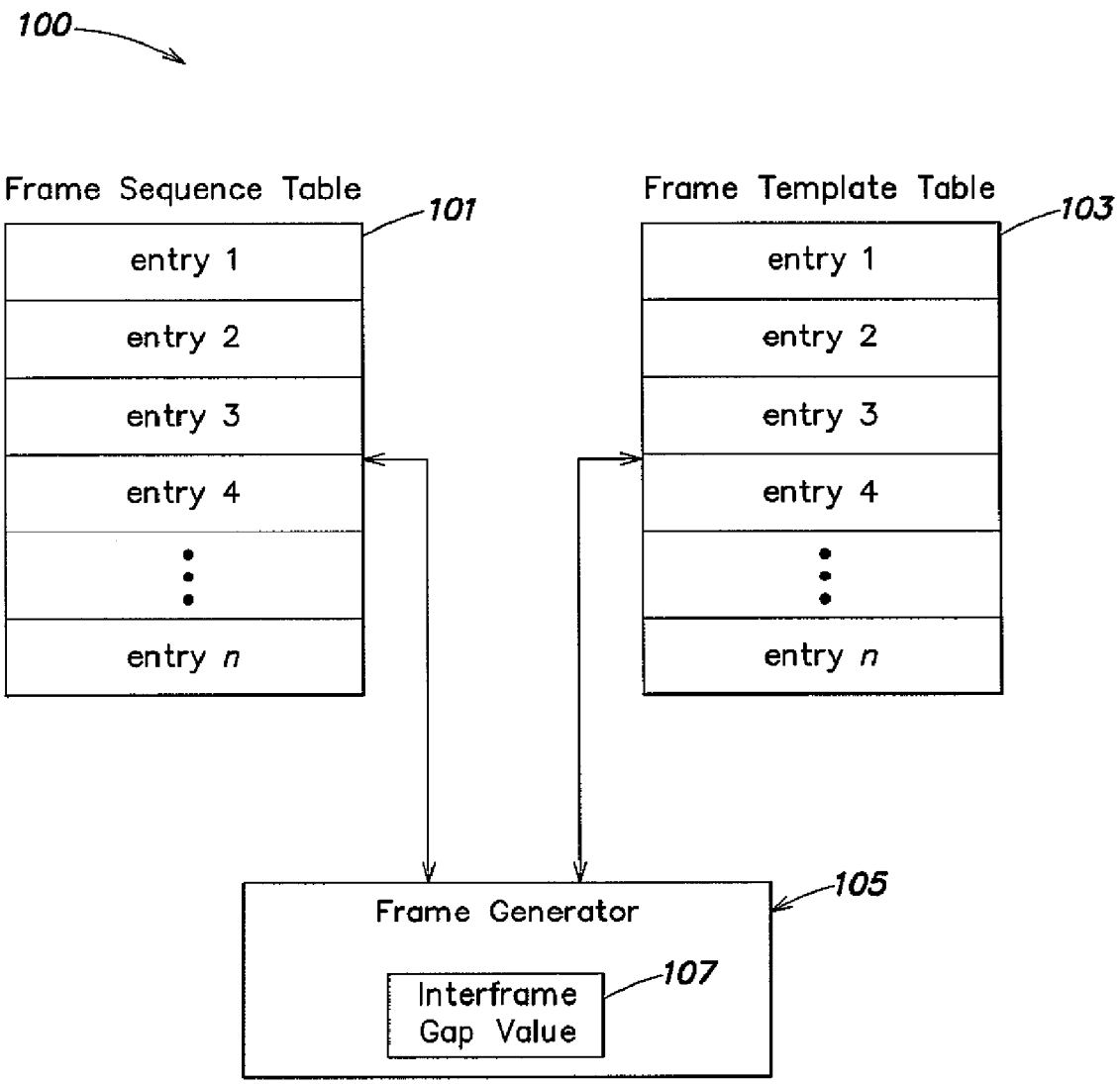
FIG. 1 is a block diagram of a prior art system for generating simulated network traffic.

FIG. 1 is a block diagram of an example of one such prior art system. In FIG. 1, network test system 100 includes a frame sequence table 101, a frame template table 103, and a frame generator 105. Each entry in frame sequence table 101 includes a frame identifier that identifies a frame to be transmitted. Thus, the sequence of indicators in frame sequence table 101 indicates the sequence of frames to be generated and transmitted. Each frame identifier identifies a template in frame template table 103 that stores information usable to generate the frame. Frame generator 105 uses the templates in frame template table 103 to generate frames for transmission. That is, frame generator 105 accesses an entry in frame sequence table 101 to determine the identifier of a frame to transmit, uses this identifier to access the appropriate frame template in frame template table 103, uses the template to generate a frame, and transmits this frame. This process is then repeated sequentially for each entry in frame sequence table 101.

An interframe gap exists between transmission of each frame in the frame sequence table. The interframe gap is a period between the end of transmission of one frame and the beginning of transmission of the next frame. Thus, after transmission of a frame, frame generator 105 does not begin to transmit the next frame until the end of the interframe gap. Frame generator 105 stores an interframe gap value 107 and uses this value to determine, after transmission of a frame, the transmission time of the next frame. Thus, for example, if the interframe gap value is twelve bytes, frame generator 105 waits the time that would be required to transmit 12 bytes before transmitting the next frame. In some situations (depending on the transmission protocol being used), frame generator 105 may transmit idle bytes during the interframe gap. Because each specific type of link takes a deterministic amount of time transmit a byte, the amount of time between transmission of frames (i.e., the interframe gap time) may be calculated. For example, for a 1 Gb Ethernet link, each byte takes 8 nanoseconds to transmit, whereas for 10 Gb Ethernet, each byte takes 0.8 nanoseconds to transmit. Thus, transmitting 12 idle bytes on a 1 Gb Ethernet link takes 96 nanoseconds.

Applicants have appreciated that prior art systems like system 100 have several drawbacks. One drawback of these prior art systems arises from the interframe gap value (e.g., interframe gap value 107 in FIG. 1) being global. That is, there is one interframe gap value that applies to all frames and the interframe gap value cannot be specified on a per frame basis. Consequently, it is impossible to simulate traffic sources in which the interframe gap changes during a transmission of a sequence of frames. One such type of traffic source may transmit data in multi-frame bursts. A multi-frame burst traffic source is a traffic source that transmits bursts of multiple frames, with a fixed interval (referred to herein as an intra-burst interval) separating frames in the burst. At a specific interval (referred to herein as a burst repetition interval) from the beginning of each burst, the next burst begins. The intra-burst interval is typically much smaller than the burst repetition interval.

Figure 2:
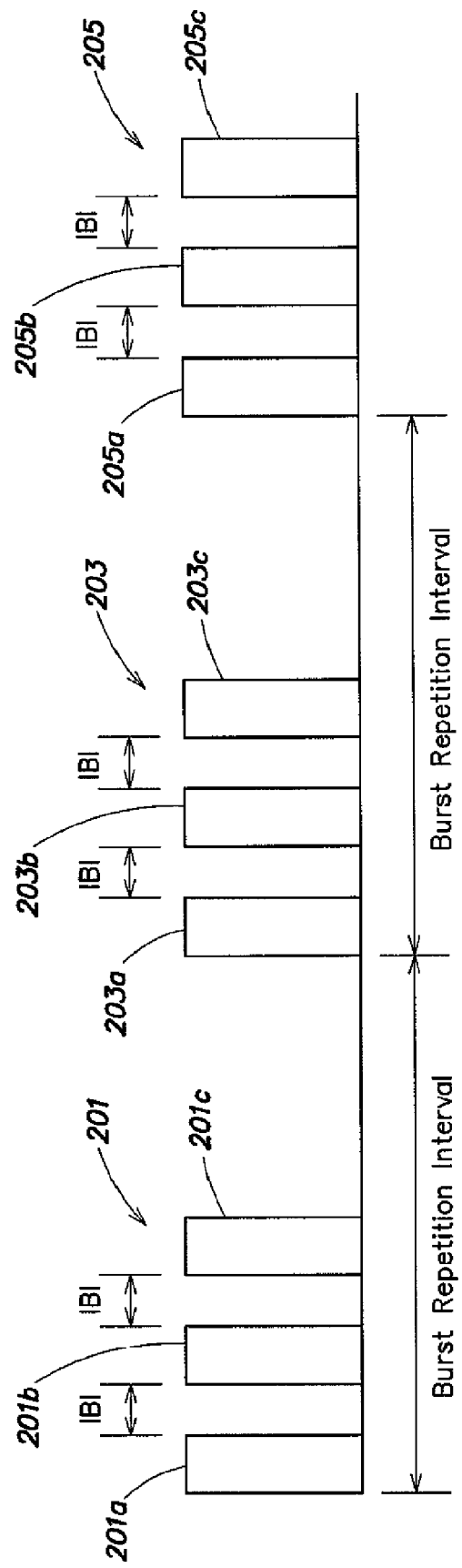
FIG. 2 is a timeline illustrating network traffic from a multi-frame burst traffic source.

FIG. 2 shows an example of traffic generated by a multi-frame burst traffic source. In the example of FIG. 2, the traffic includes three bursts (i.e., bursts 201, 203, and 205). Each burst includes three frames (i.e., burst 201 includes frames 201a, 201b, and 201c; burst 203 includes frames 203a, 203b, and 203c; and burst 205 includes frames 205a, 205b, and 205c). The frames within each burst are separated by an intra-burst interval (IBI) that is the same (or approximately the same) for all bursts. For example, in burst 201, frames 201a and 201b are separated by the intra-burst interval and frames 201b and 201c are separated by the intra-burst interval. In addition, the beginning of a burst is separated from the beginning of the subsequent burst by a burst repetition interval that is the same (or approximately the same) for all bursts. Thus, for example, the beginning of frame 201a in burst 201 is separated from the beginning of frame 203a in burst 203 by the burst repetition interval, and the beginning of frame 203a in burst 203 is separated from the beginning of frame 205a in frame 205 by the burst repetition interval.

As can be seen in FIG. 2, the interframe gap separating frames within a burst is different from the interframe gap separating the last from in one burst from the first frame in the next burst. That is, for example, the interframe gap separating frame 201b and 201c is different from the interframe gap separating frame 201c and frame 203a. Thus, the single fixed interframe gap used in prior art systems precludes generation of this type of traffic.

Another drawback of prior art systems is that, when simulating multiple periodic traffic sources having different periods, the period of each source must be an integer multiple of the traffic source with the longest period. That is, because the interframe gap value is the same for each traffic source (and the same for every frame within each traffic source), the period of a traffic source cannot be modified by altering the interframe gap, but rather is controlled by the number of frames from the traffic source in the sequence table, and how often a frame from each traffic source appears in the sequence table. For example, a periodic traffic source with 50 entries in the sequence table would be transmitted twice as often as a periodic traffic source with 25 entries in the sequence table.

Applicants have understood that, because of these drawbacks, simulated network traffic generated by these systems may not closely approximate real network traffic and, as a result, may provide an inaccurate picture of what the actual response of the network or network device(s) under test would be under real-world conditions. Applicants have further appreciated that real network traffic may include a variety of different types of data, including normal Internet traffic (e.g., HTTP traffic, file transfer operations, etc.), video traffic, and voice traffic. Video traffic sources are typically moderate bandwidth fixed-rate sources, that transmit bursts of frames at a periodic interval. Voice traffic sources are typically low bandwidth fixed-rate sources that transmit short frames at a periodic interval, wherein the frame size and period depend on the voice codec being used. Normal internet traffic is generally non-periodic traffic that, in some instances, may be restricted to specific bandwidth limits.

Thus, Applicants have appreciated that to generate simulated network traffic that approximates real network traffic, it is desirable to generate simulated traffic from multiple periodic sources with differing periods (some of which uses multi-frame bursts), as well as from normal non-periodic Internet traffic sources.

Some embodiments are directed to a system for generation of simulated network traffic, wherein the interframe gap is variable on a per frame basis. The ability to define the interframe gap for each individual frame allows the system to simulate traffic sources in which the interframe gap changes during transmission of a sequence of frames, and provides greater flexibility (e.g., as compared with a system using a fixed global interframe gap) in simulating network traffic from multiple periodic traffic sources having different periods. For example, specifying the interframe gap on a per frame basis allows the system to generate multi-frame burst traffic and multiple periodic sources with differing periods (which need not be integer multiples of the traffic source with the longest period).

Figure 3:
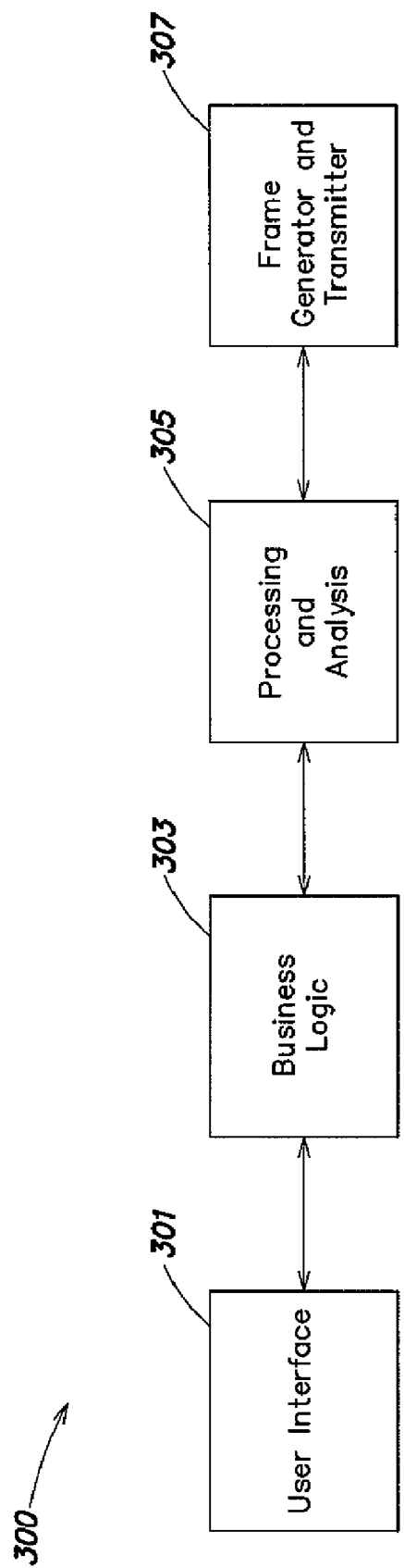
FIG. 3 is a block diagram of a system for generating simulated network traffic, in accordance with one embodiment of the invention.

The interframe gap for each individual frame may be defined in any suitable way, as the invention is not limited in this respect. One example of a system, suitable for use in some embodiments, in which the interframe gap is defined on a per frame basis is shown in FIG. 3. In the example of FIG.

3, system 300 includes a user interface 301, business logic 303, processing and analysis component 305, and frame generator and transmitter 307.

User interface 301 provides an interface through which a user can define traffic sources to be simulated and characteristics of these traffic sources. Traffic sources and traffic source characteristics may be defined in any suitable way, as the invention is not limited in this respect. For example, in some embodiments, a user can specify for a traffic source, the transmission rate of the traffic source, the transmission protocol(s) used by the traffic source, and/or any other suitable characteristic. Business logic 303 processes the information input by the user to user interface 301 to determine a sequence of frames to be transmitted to simulate the traffic source(s) identified by the user and to generate frame template information to be used by frame generator and transmitter 307 in generating frames for transmission. Processing and analysis component 305 receives the sequence of frames and frame template information from business logic 303 and provides this information to frame generator and transmitter 307. Component 305 also analyzes the response of the device(s) under test to frames transmitted by frame generator and transmitter 307. Frame generator and transmitter 307 uses the frame sequence and frame template information to generate frames and transmit them to the network and/or the network device(s) under test.

Figure 4:
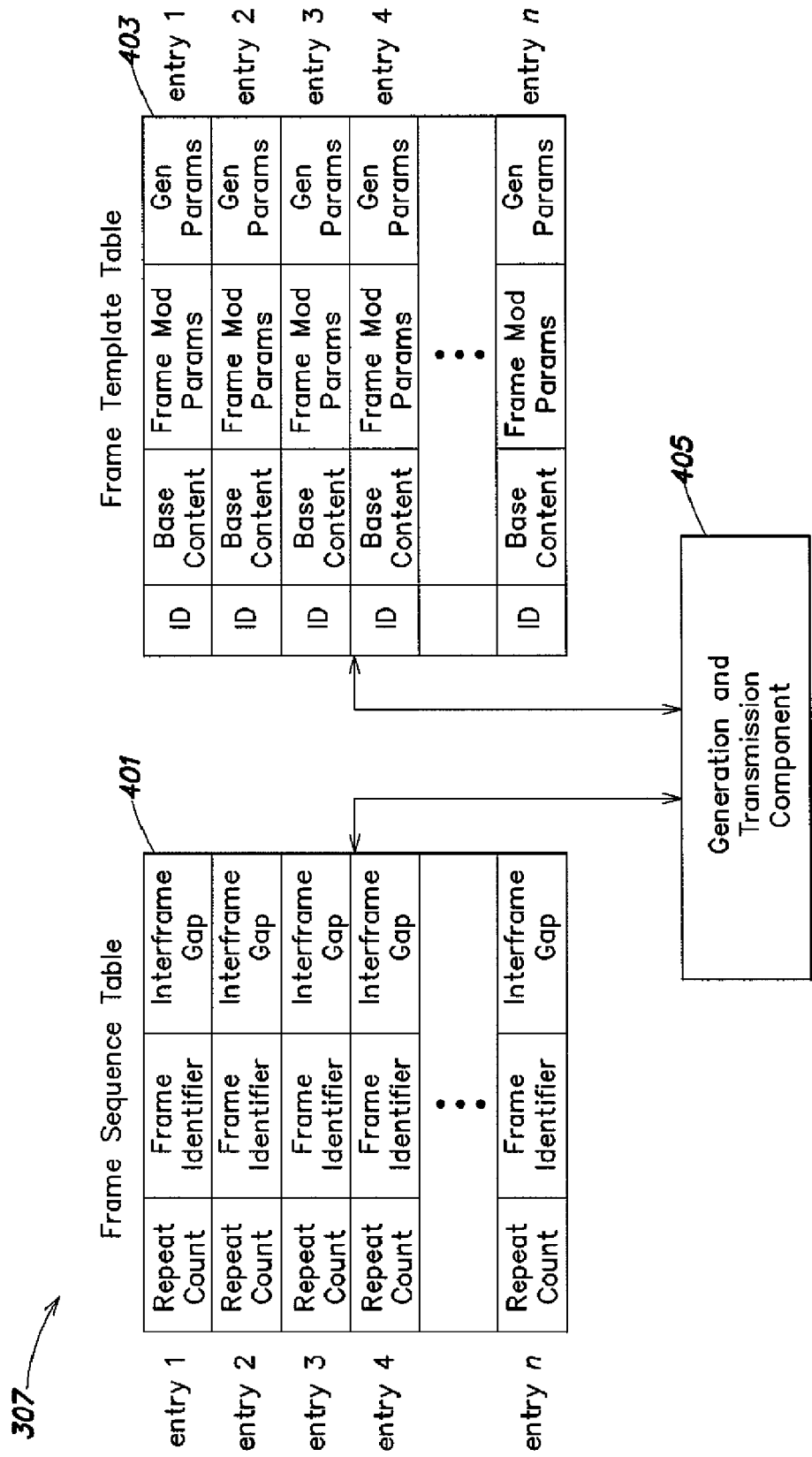
FIG. 4 is a block diagram of an illustrative frame generator and transmitter, in accordance with one embodiment.

Frame generator and transmitter 307 may generate and transmit frames in any suitable way, as the invention is not limited in this respect. FIG. 4 shows one example of a frame generator and transmitter 307 suitable for use in some embodiments. It should be understood that the illustrative architecture of frame generator and transmitter 307 depicted in FIG. 4 is only an example of one possible architecture suitable for use with the present invention, and the invention is not limited to this (or any other) specific architecture.

In the example of FIG. 4, frame generator and transmitter 307 includes a frame sequence table 401, a frame template table 403, and frame generation and transmission component 407. Frame sequence table 401 includes a plurality of entries, each of which corresponds to a frame to be generated. Generation and transmission component 405 sequentially accesses the entries in frame sequence table to determine the next frame to be generated and transmitted. Each entry in the frame sequence table includes a repeat count field, a frame identifier field, and an interframe gap field. The frame identifier field includes an identifier that identifies a frame template in frame template table 403, an interframe gap field that specifies the interframe gap to occur after the frame is transmitted until the next frame is transmitted, and a repeat count field that indicates how many copies of the frame are to be generated at that point in the sequence table (e.g., a repeat of count of two in an entry indicates that generation and transmission component is to generate and transmit two instances of the frame identified by the entry before proceeding to the next entry in the sequence table).

Each entry in frame template table 403 includes information usable by generation and transmission component 405 to generate a frame identified by an entry in frame sequence table 401. That is, each entry includes a frame identifier field that corresponds to a frame identifier in frame sequence table 401. Thus, for example, if frame sequence table includes an entry that indicates the frame with frame identifier "1" is the next frame to be generated, generation and transmission component 405 may access the entry in frame template table with the identifier "1" in the identifier field to obtain the information usable to generate the frame.

The information stored in frame template table 403 and used by generation and transmission component 405 to generate frames may be any suitable information, as the invention is not limited in this respect. In the example of FIG. 4, each entry includes a base content field, a frame generation parameters field, and a frame modifier parameters field. The base content field includes information identifying the protocol or protocols present in the frame. For example, the base content field indicates whether the frame is to include an Ethernet MAC header, VLAN tags, an IP header, a TCP header, or headers/trailers for other protocols. The frame generation parameters field may be used to indicate offsets used in the generation of frames. For example, in the IPv4 protocol, the IP header includes a fragment offset field which indicates the offset of a particular fragment relative to the beginning of the original unfragmented IP datagram. The IP header also includes a checksum field which is computed based, in part, on the fragment offset field. The fragment offset for a frame may be stored in the frame generation parameters field and used by generation and transmission component 405 to compute the header checksum for the IP header and form the IP header for the frame.

Frame modifier parameters are parameters used to modify portions of a frame that are to change each time the frame is generated. That is, for example, the same frame identifier may appear in multiple different entries in frame sequence table 401, causing generation and transmission component to generate and transmit, at different times, multiple instances of the same frame. It may be desired that certain portions of the frame be different in different instances of the frame (e.g., it may be desired that certain fields within the base content of the frame increment, decrement, or be filled with random or table-based values). For example, frame modifier parameters may include information used to modify the destination IP address of an instance of a frame or the VLAN tag associated with the instance of the frame. Thus, frame modifier parameters indicate which fields should be modified, when these fields should be modified, and how they should be modified. Generation and transmission component 405 uses this information to generate the appropriate information in each instance of the frame. The use of frame modifier parameters may permit generation and transmission component 405 to generate a large number of differing, but related frames.

It should be appreciated that the above-described fields of entries in frame template table 403 are merely examples of the types of fields and information that may be used in the generation of frames. Indeed, the invention is not limited to using these specific fields or types of information, as in some embodiments, not all of this information is necessary to generate frames and, in some embodiments, different or additional information may be used in generating frames.

The information in frame sequence table 401 and frame template table may be loaded into these tables in any suitable way and by any suitable entity or component, as the invention is not limited in this respect. As discussed above, in some embodiments, business logic 303 may generate this information (e.g., in response to user input). Business logic 303 may provide the information to processing and analysis component 305, which may load the information into frame sequence and frame template tables of frame generator and transmitter 307.

Generation and transmission component 405 may use the information in frame sequence table 401 and frame template table 403 to generate frames in any suitable way, as the invention is not limited in this respect. For example, in some embodiments, generation and transmission component 405 sequentially accesses the entries in frame sequence table 401.

For each entry in frame sequence table 401, generation and transmission component 405 accesses the corresponding entry in frame template table 403, generates the appropriate frame or frames using the information from frame template table 403, and transmits the generated frame or frames to the network and/or the network device(s) under test. After generation and transmission component 405 transmits a frame, it may determine the transmit time for the next frame using the interframe gap specified in the entry for the frame in the frame sequence table. Thus, for example, if the entry for a frame specifies that the interframe gap to follow that frame is twelve bytes, then generation and transmission component 405 may begin transmission of the next frame twelve bytes (e.g., 96 nanoseconds on a 1 Gb Ethernet link or 9.6 nanosecond on a 10 Gb Ethernet link) after the end of the previous frame.

The specification of an interframe gap in each entry of frame sequence table 403 allows generation and transmission component 405 to generate simulated network traffic that includes traffic from one or more multi-frame burst source, one or more non-burst periodic sources having the same or differing periods, and/or one or more non-periodic sources. For example, to generate simulated network traffic from a multi-frame burst traffic source having three frames per burst, an intra-burst interval of 12 bytes, and an interval of 240 bytes between bursts (without simulating any other traffic sources) a frame sequence table such as illustrative frame sequence table 500 in FIG. 5 may be used. Frame sequence table 500 includes a first entry 501 which has a repeat count of 2, a frame identifier of 1, and an interframe gap of 12 bytes. The repeat count in entry 501 indicates that two instances of this frame are to be generated at this point in the frame sequence table. Thus, entry 501 may be used in generating the first two frames of a multi-frame burst. Each of these two frames is followed by an interframe gap of 12 bytes (i.e., the intra-burst interval). Entry 503 is used in generating the third frame of the burst. This frame is followed by an interframe gap of 240 bytes (i.e., the interval between the end of one burst and the start of the next burst). Entry 505 is used in generating the first two frames of the next burst. As with entry 501, the interframe gap following each of these frames is the intra-burst interval of 12 bytes. Entry 507 is used in generating the third frame of this burst, thus the interframe gap for this frame is set to 240 bytes.

The illustrative frame sequence table 500 in FIG. 5 includes entries used to generate two multi-frame bursts. It should be appreciated that this abbreviated table is provided merely as an example and may include entries for generating any suitable number of multi-frame bursts, as the invention is not limited in this respect. Further, in some embodiments, when the generation and transmission component reaches the end of the frame sequence table, it may return to the beginning of the sequence table and generate and transmit the frame (or frames) corresponding to the first entry. This frame may be transmitted at a time corresponding to the end of the interframe gap associated with the last entry in the sequence table. Thus, in embodiments in which the generation and transmission component wraps to the beginning of the table, frame sequence table 500 may include entries for only one burst (as the generation and transmission component may generate frames for additional bursts by wrapping back to the beginning of the table).

Further, illustrative frame sequence table 500 includes entries for only a single traffic source (i.e., a multiframe burst traffic source). It should be appreciated that the invention is not limited in this respect, as frame sequence table may include entries for any suitable number and type of traffic sources.

As discussed above, in some embodiments, business logic 303 processes the information input by the user to user interface 301 to determine the sequence of frames to be loaded into the frame sequence table, and to generate frame template information to be used by frame generator and transmitter 307 in generating frames for transmission. Business logic 303 may determine the sequence of frames to be transmitted in any suitable way, as the invention is not limited in this respect.

In some embodiments, business logic 303 determines a sequence of frames in a manner that reduces the amount of jitter in the periodic traffic sources. Jitter refers to imprecision in the periodicity of a periodic source. That is, a periodic traffic source that is exactly periodic experiences no jitter. Business logic 303 may reduce the jitter in periodic traffic sources in any suitable way, as the invention is not limited in this respect.

Figure 6:
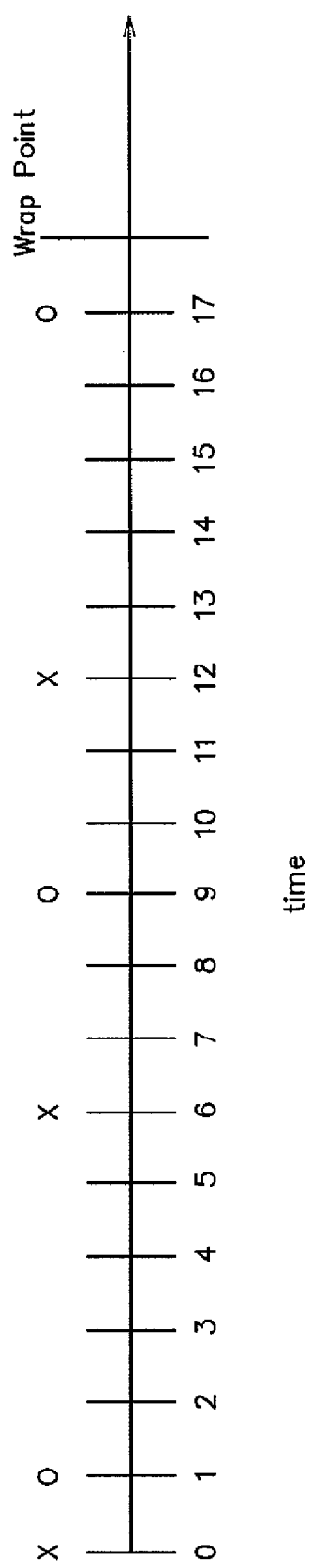
FIG. 6 is a timeline showing transmit times for a sequence of frames with a designated wrap point.

In some embodiments, business logic 303 may reduce jitter by selecting an appropriate wrap point. A wrap point is a point at which a sequence of frames to be transmitted ends and is repeated. In situations where there are multiple periodic sources whose periods are not integer multiples of the period of the longest period source, repeating the sequence of frames may cause jitter in some of the periodic sources. For example, FIG. 6 shows a timeline of a sequence of frames transmitted by two periodic traffic sources. The sequence has a wrap point at 18 seconds (i.e., the sequence repeats every 18 seconds). Traffic source 1 has a period of 6 seconds, and transmits a frame at 0 seconds, 6 seconds, and 12 seconds (as shown by the "x" symbols in FIG. 6). Traffic source 2 has a period of 8 seconds and transmits a frame at 1 second, 9 seconds and 17 seconds (as shown by the "o" symbols in FIG. 6). When the sequence repeats, the transmission of the next frame from traffic source 1 occurs at 18 seconds (6 seconds from the transmission of the last frame from traffic source 1). However, the transmission of the next frame from traffic source 2 occurs at 19 seconds (i.e., only 2 seconds from the transmission of the last frame from traffic source 2). Because the period of traffic source two is 8 seconds, repeating the sequence (i.e., wrapping) results in jitter in the periodicity of traffic source 2. However, by selecting a different wrap point, the jitter in traffic source 2 may be reduced.

Figure 7:
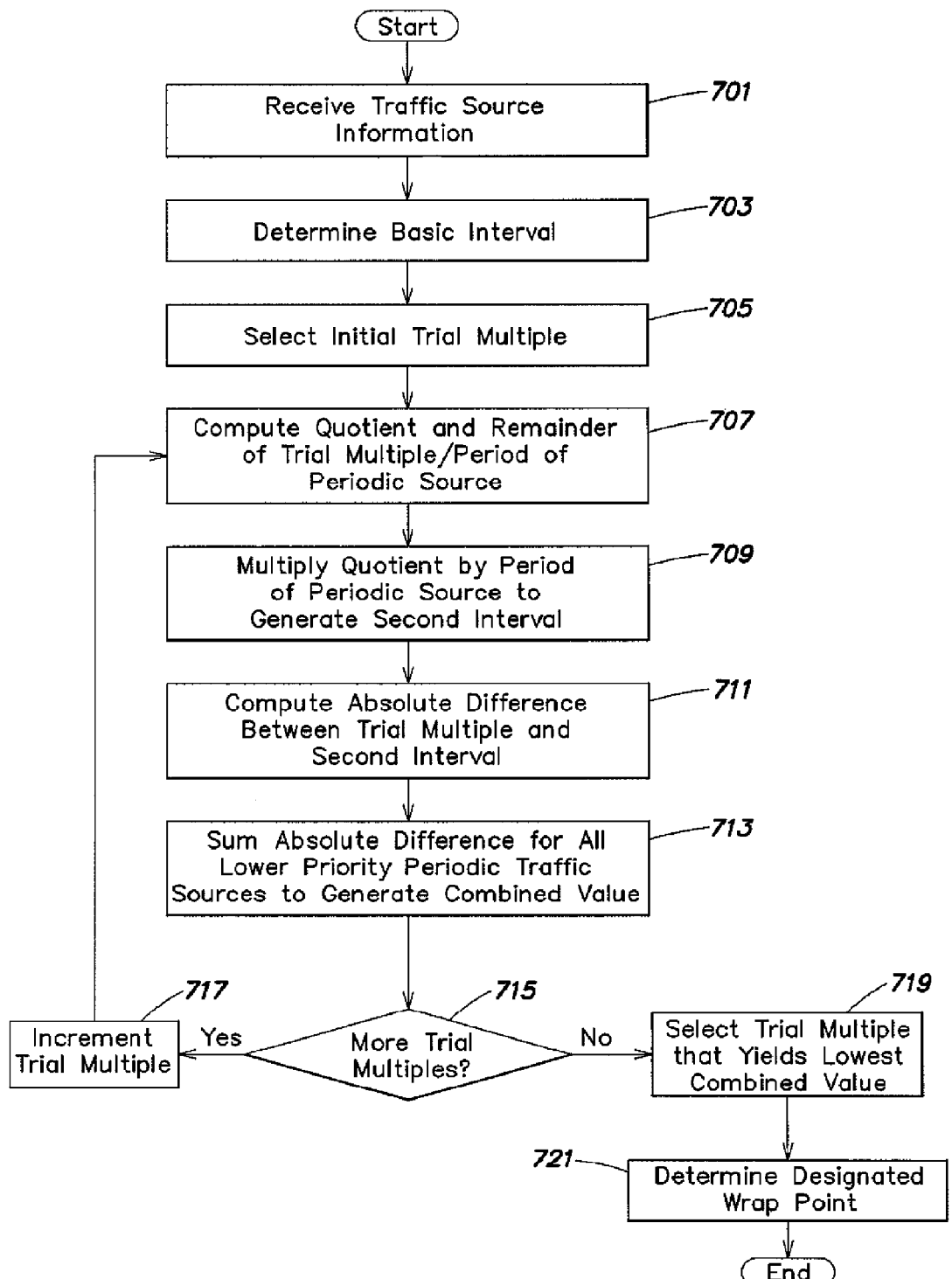
FIG. 7 is a flow chart of an illustrative process for determining a designated wrap point, in accordance with one embodiment.

Business logic 303 may select a wrap point that reduces jitter in any suitable way, as the invention is not limited in this respect. FIG. 7 is a flow chart of an illustrative process for determining a wrap point for a sequence of frames, suitable for use in some embodiments. The process begins at act 701, where the business logic receives information describing the traffic sources to be simulated. Business logic 303 may receive this information in any suitable way from any suitable source, as the invention is not limited in this respect. For example, as discussed above, this information may be received from a user interface (e.g., based on information input by a user). The process then continues to act 703, where the information describing the traffic sources is used to determine the basic interval. The basic interval refers to the least common multiple of the periods of the highest priority periodic sources.

A periodic traffic source is a traffic source that transmits frames or multi-frame bursts at a regular interval. In some embodiments, periodic traffic sources to be simulated may be classified based on their priority. The periodic traffic sources may be classified in any suitable way, based on any suitable criteria, as the invention is not limited in this respect. For example, traffic sources for which jitter is the least tolerable may given higher priority and traffic sources for jitter is more tolerable may be given lower priority. In some embodiments, traffic sources may be classified as either highest priority traffic sources or lower priority traffic sources. In embodiments in which a user defines the traffic sources to be simulated via a user interface, the user may specify which traffic sources are highest priority sources and which are lower priority traffic sources.

In some embodiments, there may be only a single traffic source that is classified as a highest priority traffic source. In other embodiments, there may be multiple traffic sources classified as highest priority traffic sources, but the periods of each of the highest priority traffic sources are related (e.g., the period of each highest priority traffic source is an integer multiple of the period of the highest priority traffic source with the smallest period).

Once the basic interval (i.e., the least common multiple of the periods of the highest priority traffic sources) is determined, the process continues to act 705, wherein an initial trial multiple is selected. A trial multiple is an integer multiple of the basic interval. The initial trial multiple may be any suitable multiple of the basic interval. For example, in some embodiments, the initial trial multiple may be one times the basic interval (i.e., the basic interval itself). However, the invention is not limited in this respect as any suitable integer multiple of the basic interval may be used as the trial multiple.

The process next continues to act 707 where, for each lower priority periodic traffic source to be simulated, the quotient and remainder of the trial multiple divided by the period of the periodic source is computed. The process then continues to act 709, where for each lower priority periodic source, the quotient for that traffic source computed in act 707 is multiplied by the period of the periodic source to generate a second interval for each lower priority periodic traffic source. The process then continues to act 711 where, for each second interval computed in act 709, the absolute difference between the trial multiple and the second interval is determined. The process next continues to act 713, where the absolute differences computed in act 711 are summed together to generate a combined value.

Thus, the result of acts 707-713 for a given set of traffic sources to be simulated and for a given trial multiple is a combined value. That is, there may be a separate combined value for each trial multiple which is used in acts 707-713. Once the combined value for a trial multiple is determined, the process continues to act 715, where it is determined if there are additional trial multiples for which to repeat acts 707-713, or if the process has been repeated for all desired trial multiples. That is, as discussed in more detail below, acts 707-713 may be repeated for any suitable number of trial multiples and a combined value for each of these trial multiples may be determined. The number of trial multiples for which to repeat acts 707-713 may be any suitable number and may be determined in any suitable way, using any suitable criterion or criteria. In some embodiments, the number may be based on the amount of memory available to store the frame sequence table. That is, the value of the trial multiple is proportional to the size of the wrap point. Thus, large trial multiples result in large wrap points. Because, in some embodiments, a large wrap point results in more frames in a sequence, larger wrap points cause the frame sequence table to be larger. A limit on the value of the trial multiple may be imposed so that the size of a resulting sequence table does not exceed the amount of memory available to store the sequence table.

When it is determined, at act 715, that there are more trial multiples for which to repeat acts 707-713, the process continues to act 717, where the trial multiple is incremented to the next integer multiple of the basic interval. For example, if, prior to act 715, the trial multiple is equal to two times the basic interval, then at act 717 the trial multiple may be incremented to three times the basic interval. The process then returns to act 707, whereafter acts 707-713 are repeated for the new trial multiple. When it is determined, at act 715, that acts 707-713 have been performed for all desired trial multiples, the process continues to act 719, where the trial multiple that yields the lowest combined value is selected as the designated interval. The process then continues to act 721 where the designated interval is used to compute the designated byte wrap point. The designated byte wrap point is the designated interval converted to bytes. For example, if the designated interval is 120.121 milliseconds, the designated wrap point is the total number of bytes that can be transmitted during a 120.121 millisecond period. The number of bytes that can be transmitted during a given period depends on the transmit rate of the link under test. For example, on a 1 Gb Ethernet link, a byte may be transmitted in 8 nanoseconds. Thus, the designated byte wrap point for a designated interval of 120.121 milliseconds over a 1 Gb Ethernet link is 15015125 bytes.

In some embodiments, once business logic 303 selects a wrap point, business logic 303 may determine a sequence of frames to be transmitted and an interframe gap to follow each frame. This information may ultimately be loaded into the frame sequence table used by the frame generator and transmitter in generating and transmitting frames. Business logical 303 may determine the sequence of frames and their corresponding interframe gaps in any suitable way, as the invention is not limited in this respect. In some embodiments, business logic 303 may determine the sequence of frames such that the sum of all frame lengths and interframe gaps in the sequence is equal to the designated byte wrap point. This may be done in any suitable way, as the invention is not limited in this respect.

For example, in some embodiments, business logic 303 may construct a linked list of elements, with each element corresponding to an entry in the frame sequence table.

Figure 8:
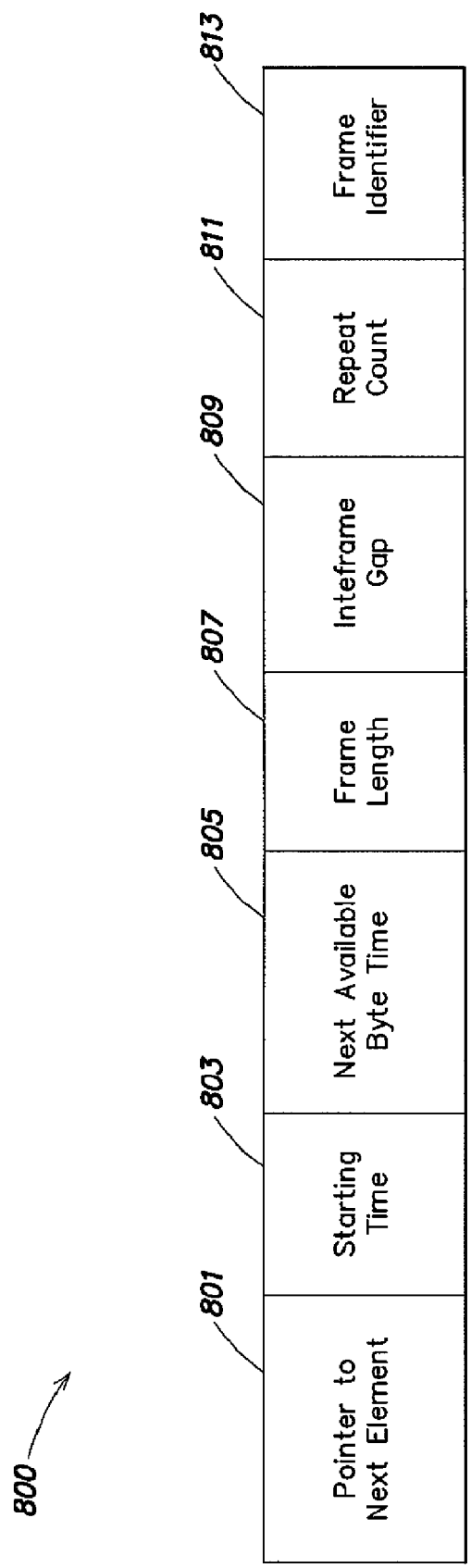
FIG. 8 is a diagram of an illustrative format of an element in a linked list of a sequence of frames to be transmitted, in accordance with one embodiment.

FIG. 8 shows an example of an illustrative structure of an element in the linked list. As shown in FIG. 8, element 800 includes a plurality of fields. Field 801 specifies a pointer to the next element in the linked list (or a null pointer in the case of the last element in the linked list). Field 803 specifies a starting time (e.g., in bytes) of the frame. Thus, for example, the first element in the linked list may have a starting time of 0 bytes. Field 805 specifies the next available byte time (i.e., the earliest time at which the next frame can be transmitted). The next available byte time may be computed as the starting time of the frame plus the frame length plus a minimum interframe gap for the frame. In some embodiments, the transmission protocol being used requires a preamble added to the beginning of each frame. For example, the Ethernet standard specifies a preamble of 8 bytes at the beginning of each frame. In such embodiments, the next available byte time frame may be determined by summing the start time of the frame, the preamble, the frame length, and the minimum interframe gap. Field 807 specifies the length of the frame in bytes. Field 809 specifies the interframe gap between the frame and the start of the next frame corresponding to the next element in the linked list. Field 811 is the repeat count for the frame (e.g., similar to the repeat count specified in each entry of the frame sequence table), and field 813 specifies an identifier that identifies the frame to be transmitted. The identifier in field 813 may correspond to a frame template used to generate the frame.

Construction of the linked list may begin by first creating an element for the first instance (i.e., the first frame or the first frames if the source is a multi-frame burst traffic source) of the highest priority periodic source with the longest period.

The interframe gap in this entry is set so that the frame length plus the interframe gap is equal to the designated byte wrap point. Next, an element for each additional instance of this traffic source may be inserted serially into the link list. As the element for each instance is added to the linked list, the interframe gap of the previous element is adjusted such that each instance is separated from the previous instance by the period of the traffic source, and the interframe gap for the newly added instance is set so that the sum of all preambles, frame lengths, and interframe gaps in the linked list is equal to the designated byte wrap point. Additional instances of this traffic source may be added until no more instances can be added without the sum of all preambles, frame lengths, and interframe gaps exceeding the designated byte wrap point.

Once the highest priority periodic source with the longest period has been placed into the linked list, additional highest priority periodic sources may be added. This may be done in any suitable way, as the invention is not limited in this respect. For example, in some embodiments, to add the next highest priority periodic source, the desired starting time of the first instance of this source is determined. That is, it is determined how long (e.g., how many bytes) after the frame (or frames) corresponding to the first element of the linked list the first instance of this traffic source should be transmitted. This decision may be made in any suitable way, as the invention is not limited in this respect. For example, in some embodiments, the first instance of this traffic source may be placed such that it is transmitted at the first possible time after the first element in the linked list. In some embodiments, the nature of the link may require a minimum interframe gap. For example, the Ethernet standard specifies a minimum interframe gap of 12 bytes. Thus, for example, in embodiments in which a frame is transmitted at the first possible time after the first element in the linked list, the frame could be transmitted 12 bytes after the last frame of the first element in the linked list. In other embodiments, the first instance of the traffic source may be placed such that it is uniformly distributed between the frame of the first two elements.

Once the desired starting time of the first instance of this traffic source is determined, an element for each instance of the traffic source may be created and placed in to the linked list. This may be done in any suitable way, as the invention is not limited in this respect. For example, in some embodiments, the desired starting time of each instance of the traffic source may be determined by adding the period of the traffic source to the end of the last instance of the traffic source (or, in the case of the first instance of a traffic source, selecting the desired starting time). An element for the instance may be inserted in the linked list by comparing the desired starting time of the instance with the starting times and next available byte times of elements already in the linked list, to determine where in the list the new instance should be inserted. If the desired starting time of the instance falls within the interframe gap of a previous element in the list, an element for the instance is inserted in the linked list after the previous element, and the interframe gap of the previous element is updated so that it ends at the starting time of the newly inserted element. The interframe gap of the newly inserted element is adjusted so that it ends at the starting time of the subsequent element in the linked list.

If the desired starting time of an instance of the traffic source conflicts with an existing element in the linked list (e.g., the desired starting time falls within a frame of an existing instance (or a preamble of the frame), or falls within the minimum interframe gap of an existing instance), then the actual starting time of the element for the instance is adjusted from the desired starting time. The starting time may be adjusted in any suitable way, as the invention is not limited in this respect. For example, in some embodiments, the starting time of the element may be delayed (relative to the desired starting time) until the end of the conflicting preamble, frame, or minimum interframe gap. In other embodiments, the starting time of the element may be moved up from the desired starting time so that the instance of the element (and, in some embodiments, a minimum interframe gap) are completed before the starting time of the conflicting element. Adjusting the starting time of the element from the desired starting time may introduce jitter into the periodicity of the traffic source. Thus, in some embodiments, the starting time may be adjusted in the way that introduces the least jitter, though the invention is not limited in this respect.

The process may be repeated for each of the highest priority periodic traffic sources. Once all of the highest priority periodic traffic sources have been inserted into the linked list, the lower priority periodic sources may be inserted into the linked list using the same process. For each subsequent periodic source that is inserted into the linked list, the likelihood of conflicts with the desired starting times of instances of these sources increases. That is, because as each source is added, there are more frames in the linked list, the likelihood of a conflict with a frame and/or minimum interframe gap increases. Thus, in some embodiments, the order in which periodic traffic sources are added to the linked list may be based on how much jitter is tolerable in the periodicity of the traffic sources. For example, periodic traffic sources for which jitter is least desirable may be added before to the list before periodic traffic sources for which jitter is most tolerable.

Once all of the periodic traffic sources have been added, any non-periodic traffic sources may be added to the linked list. An instance of a non-periodic traffic source may be added by inserting an element corresponding to an instance of the traffic source into the linked list at an available space in the existing interframe gaps, and adjusting the interframe gap of the previous element to end at the starting time of the newly inserted element. The number of instances of a non-periodic source to insert into the list may be determined in any suitable way, as the invention is not limited in this respect. In some embodiments, non-periodic traffic sources have associated byte rates, which may be used to determine how many instances to insert into the list and where these instances are to be inserted.

FIGS. 9A-9F illustrate how a linked list may be constructed for a particular set of traffic sources to be simulated on a 1 Gb Ethernet link. In FIGS. 9A-9F, each rectangular box corresponds to an instance of a traffic source. In the example of FIGS. 9A-9F the traffic sources to be simulated are: two low-bandwidth video traffic sources, each transmitting multi-frame bursts of four frames with a frame length of 1536 bytes, an interframe gap of 12 bytes between frames in the burst, and a burst repetition interval of 16.384 milliseconds; two high-bandwidth video sources, each transmitting multi-frame bursts of eight frames, with a frame length of 1536 bytes and an interframe gap of 12 bytes between frames in a burst, and a burst repetition interval of 16.384 milliseconds; two voice-over-IP traffic sources using a G.711 codec, each transmitting single frames (i.e., not multi-frame bursts) of 214 bytes at a period of 20 milliseconds; and two voice-over-IP traffic sources using a G.723 codec, each transmitting single frames of 74 bytes with a period of 30 milliseconds.

In this example, the four video traffic sources are designated as highest-priority traffic sources and the four voice-over-IP traffic sources are designated as lower priority traffic sources. Thus, the basic interval for this set of traffic sources (i.e., the least common multiple of the highest priority traffic sources) is 16.384 milliseconds. For this set of traffic sources, using a trial multiple of 180.224 milliseconds (11 times the basic interval) yields the lowest combined value. Thus, the designated wrap point for a 1 Gb Ethernet link is 22528000 bytes.

Figure 9B:
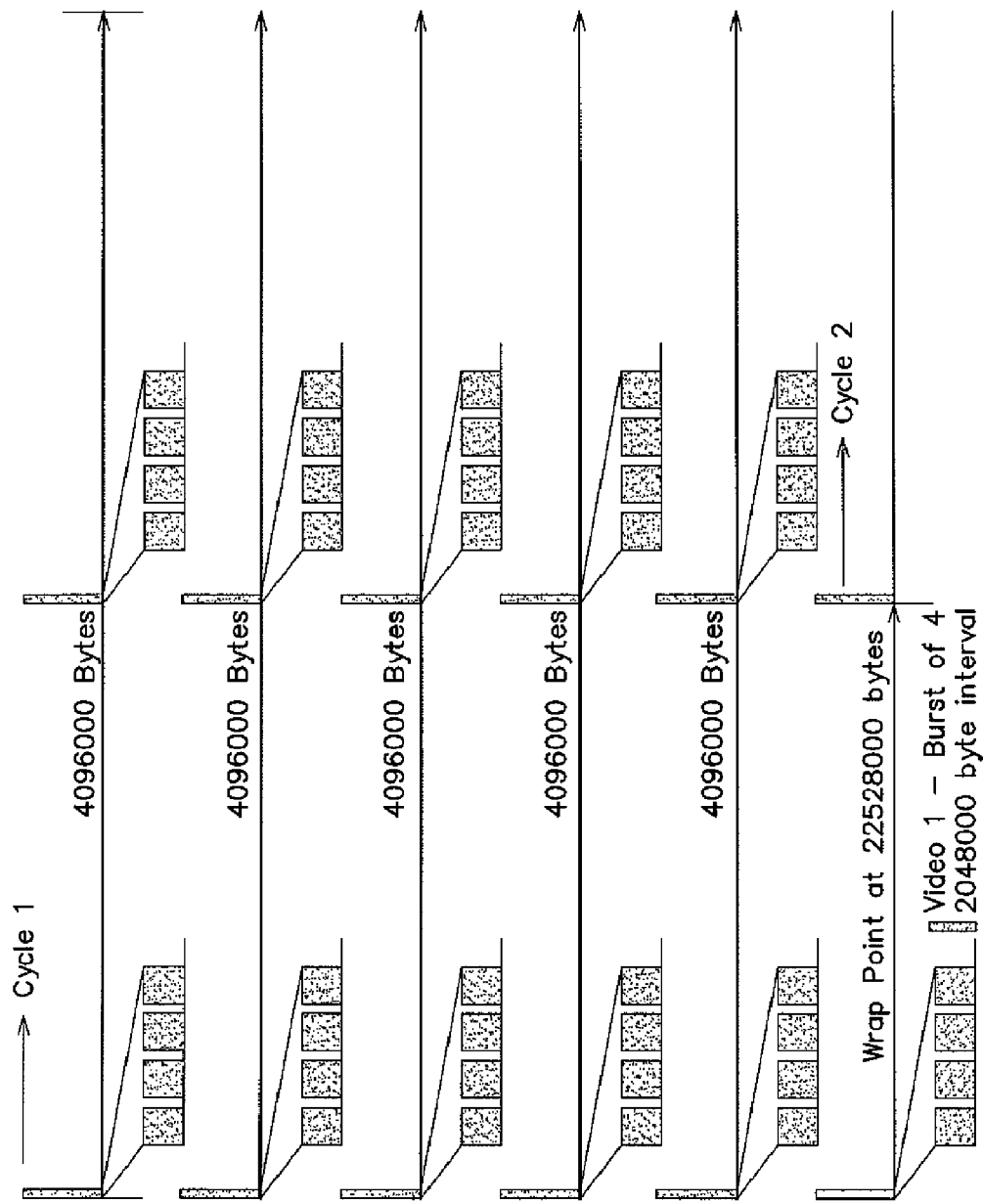

Construction of the linked list begins by inserting the first of the highest-priority periodic sources. In this example, the first traffic source inserted into the list is one of the low-bandwidth video sources. FIG. 9A shows a first instance of this traffic source inserted into the linked list. This instance may be inserted into the linked list using four elements (i.e., one for each frame) in the instance. Element 1 has a starting time at 0 bytes, element 2 has a starting time at byte 1556 (i.e., the frame length of the frame of the element 1, plus an 8 byte preamble, plus a 12 byte interframe gap), element 3 begins at byte 3112, and element four begins at byte 4668. The next available byte after element four (i.e., the earliest any subsequently added frame could start) is byte 6224. The interframe gap for the first three frames is 12 bytes and the interframe gap for frame 4 is 22521788 bytes (i.e., the designated wrap point minus the sum of the frame lengths, preambles, and interframe gaps of the first three elements and the frame length and preamble of the fourth element). In FIGS. 9A-9F the designation "cycle 2" shows the point at which a frame generator reaches the designated wrap point, and would return to the beginning of the linked list and begin generating frames from the beginning.

As shown in FIG. 9B, the remaining instances of this traffic sources are then inserted into the linked list. This results in 44 elements (11 instances) for the traffic source being inserted into the linked list. As discussed above, when the second instance of the traffic source is inserted, the interframe gap associated with element 4 of the linked list is adjusted to 2041788 bytes, so that that the second instance begins exactly at byte 2048000 (i.e., 16.384 milliseconds from the beginning of the first frame).

In some embodiments, the number of elements in the list may be reduced by using the repeat count field. For example, for the first video traffic source input into the list in the example of FIG. 9A-9F, there may be two elements in the list for each four frame burst. That is, a first element 3 (used in generating the first three frames of a burst) with a repeat count of 3 and an interframe gap of 12 bytes may be followed by a second element (used in generating the fourth frame of a burst) with a repeat count of 1 and an interframe gap that ends at the starting time of the first frame of the next burst. This results in 22 elements in the list for this video source, as opposed to 44 elements without using the repeat count field.

Figure 9C:
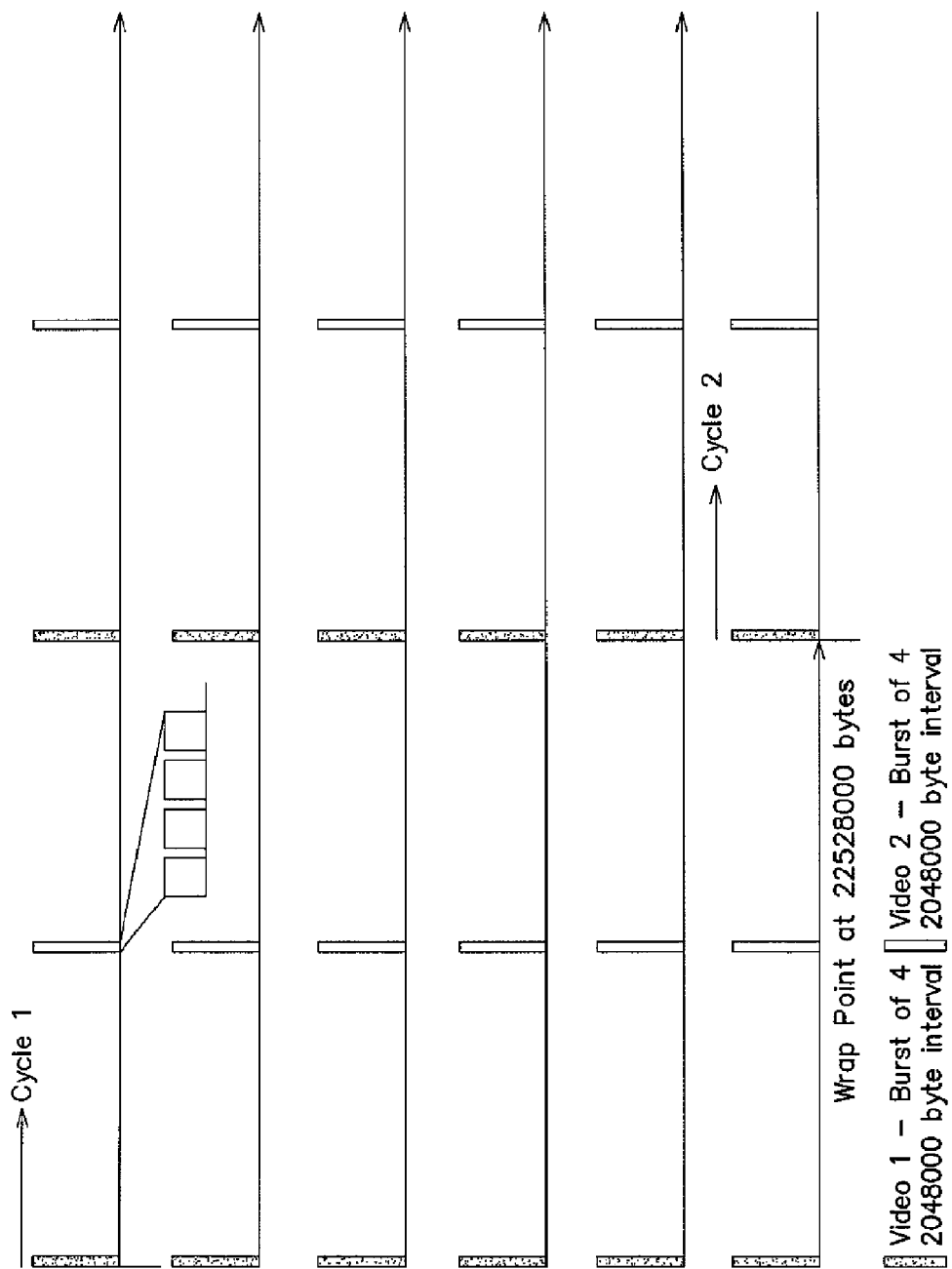

FIG. 9C shows the second highest priority periodic source added to the list. In this example, the second source added to the list is the second low-bandwidth video traffic source. The first instance of this traffic source is positioned halfway in between the first two instances of the first low-bandwidth video traffic source. As discussed above, the invention is not limited in this respect, as the first instance may be positioned in any suitable location. Each instance of this traffic source is a four frame burst. However, in FIGS. 9C-9F the number of frames in a burst is only shown on the first instance of traffic source for the sake of simplicity and clarity.

Figure 9D:
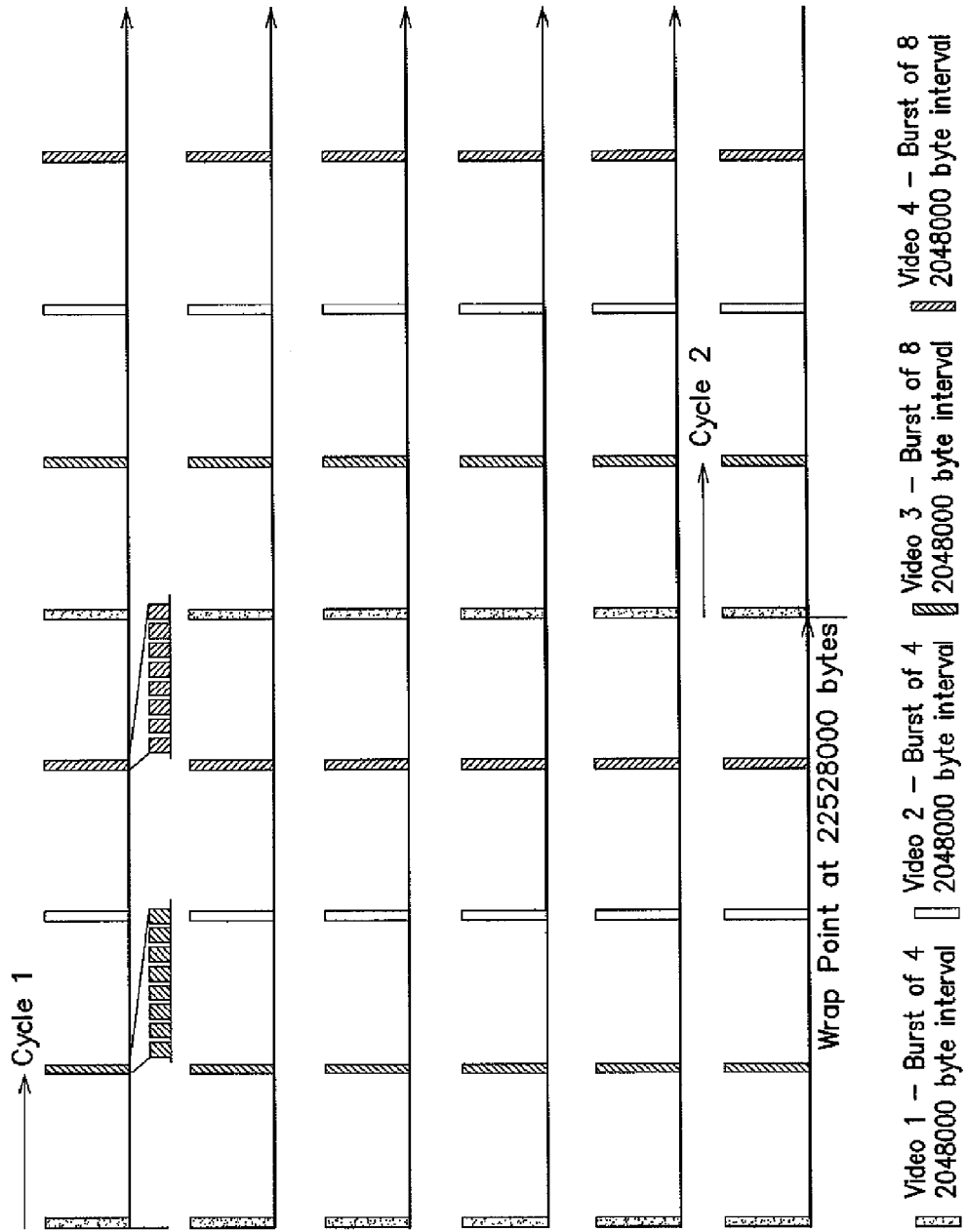

FIG. 9D shows the third highest priority periodic source and the fourth highest priority periodic source added to the list. Each of these traffic sources transmits a periodic eight frame burst. The first instances of these sources are positioned uniformly between the first and second instances of the initially inserted highest priority periodic traffic source (though the invention is not limited to any particular positioning or location of the first instance of these traffic sources).

Figure 9E:
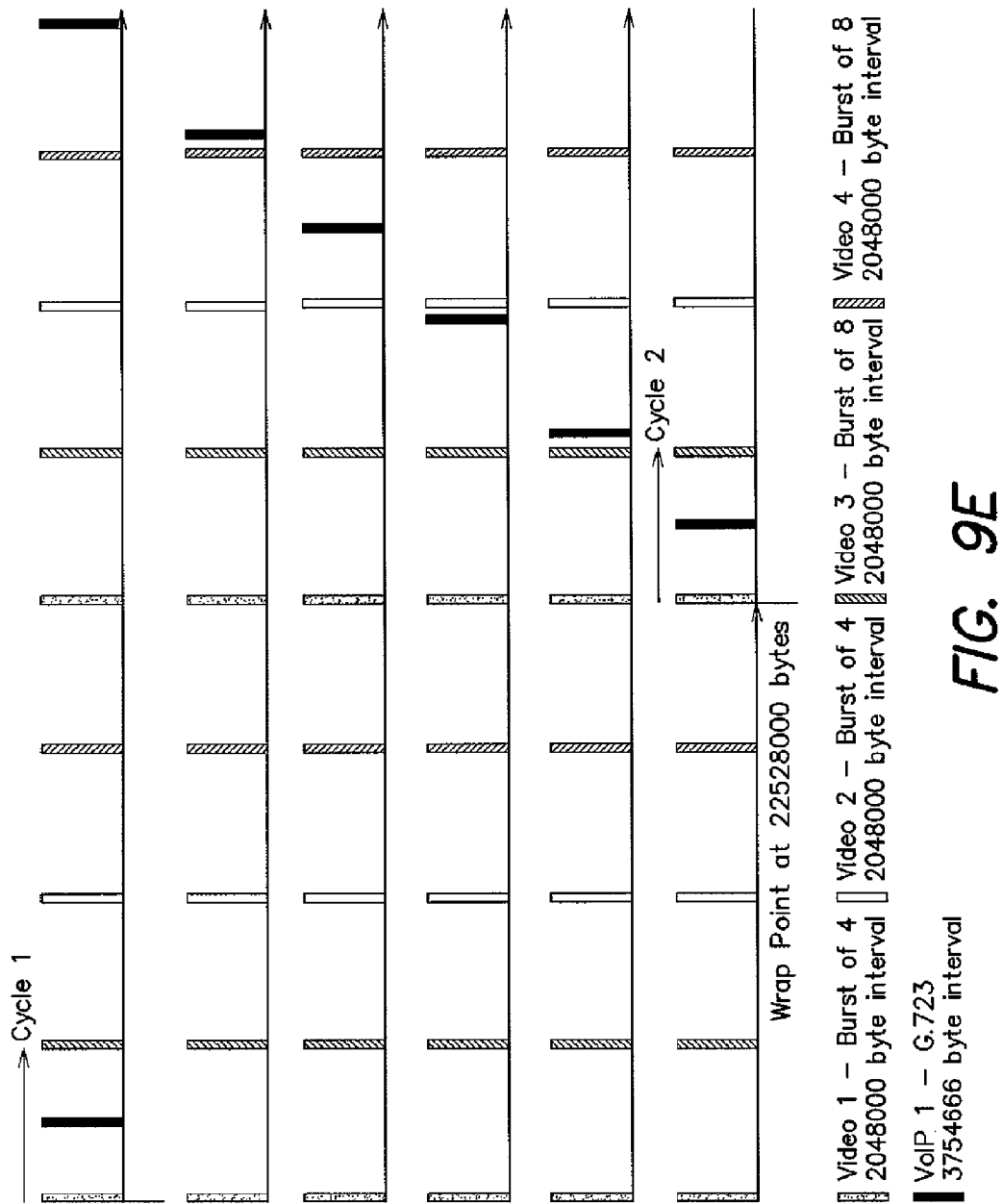

FIG. 9E shows the first low-priority periodic source added to the list (i.e., the first G.723 codec voice-over-IP source). The first instance of this source is placed halfway between the first instance in the list and the second instance in the list.

Figure 9F:
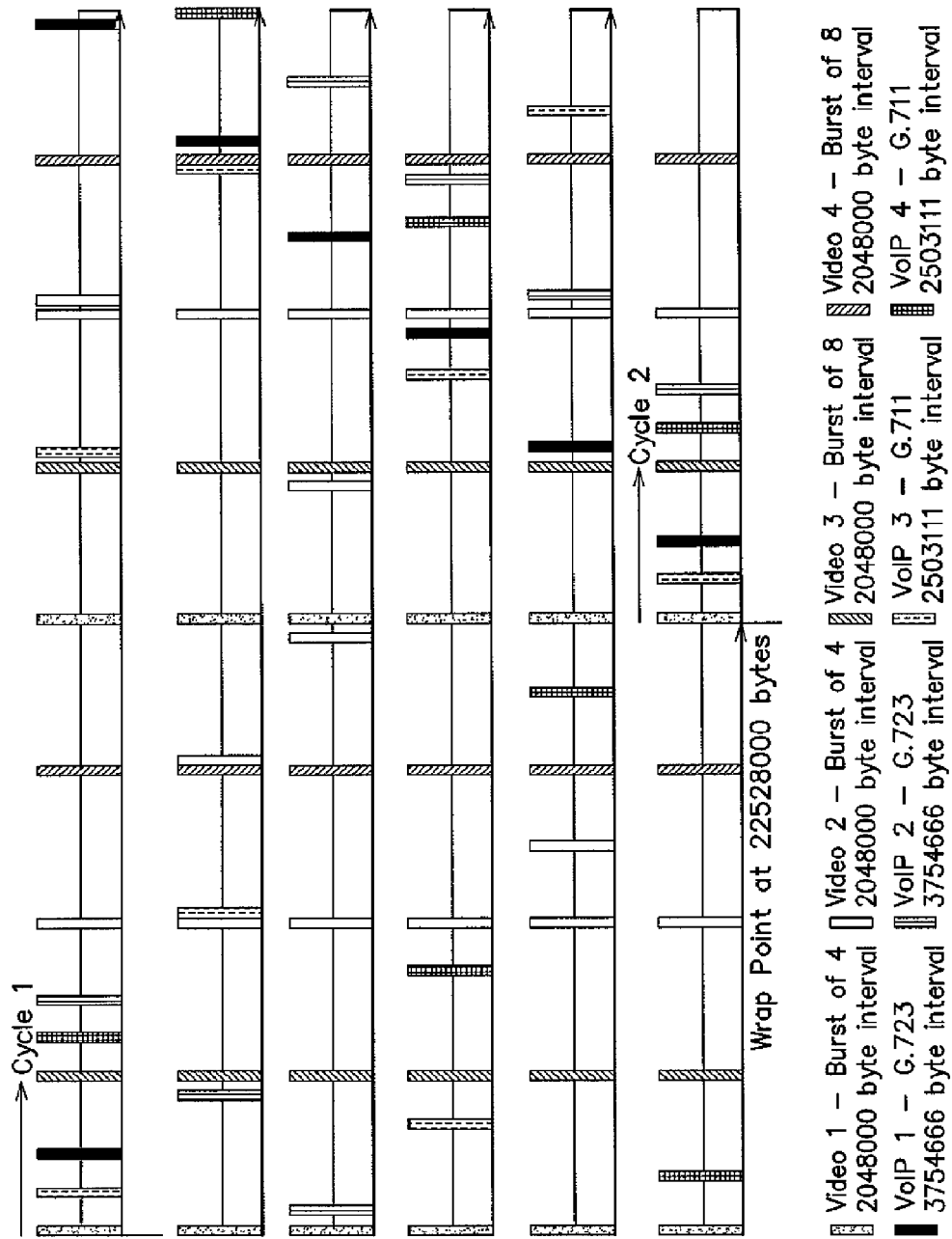

FIG. 9F shows the remaining low-priority periodic sources added to the list (i.e., the second G.723 codec voice-over-IP source and the two G.711 codec voice-over-IP sources). The shaded gray area shows interframe gap locations where it is possible to add non-periodic traffic sources if desired (though none are shown in this example). The sum of all preambles, frame lengths and interframe gaps in the list is equal to the designated byte wrap point (i.e., 22528000 bytes).

The above-described embodiments may be implemented in any suitable way, as the invention is not limited in this respect. These embodiments may be implemented on any suitable computer or computers and may be implemented using hardware, software, or any combination thereof. When these embodiments (or portions thereof) are implemented in software, the software code can be executed on any suitable processor or collection of processors, whether provided in a single computer or distributed among multiple computers.

It should be appreciated that any component or collection of components comprising hardware and/or software that perform the functions of the above-described embodiments can be generically considered as one or more controllers that control the above-discussed functions. The one or more controllers can be implemented in numerous ways, such as with dedicated hardware (e.g., one or more FPGAs), with general purpose hardware (e.g., one or more general purpose processors) programmed using microcode or software to perform some or all of these functions, and/or any combination thereof.

In this respect, it should be appreciated that one implementation of the embodiments of the present invention comprises at least one computer readable medium (e.g., a computer memory, magnetic disk, optical disc, flash memory, etc.) encoded with a computer program (i.e., a plurality of instructions), which, when executed on a processor, perform some or all of the above-discussed functions of the embodiments of the present invention.

The computer-readable medium can be transportable such that the program stored thereon can be loaded onto any computer environment resource to implement the aspects of the present invention discussed herein. In addition, it should be appreciated that the reference to a computer program which, when executed, performs the above-discussed functions, is not limited to an application program running on a host computer. Rather, the term computer program is used herein in a generic sense to reference any type of computer code (e.g., software or microcode) that can be employed to program a processor to implement the above-discussed aspects of the present invention.

It should be appreciated that in accordance with several embodiments of the present invention wherein processes are implemented in a computer readable medium, the computer implemented processes may, during the course of their execution, receive input manually (e.g., from a user).

Figure 10:
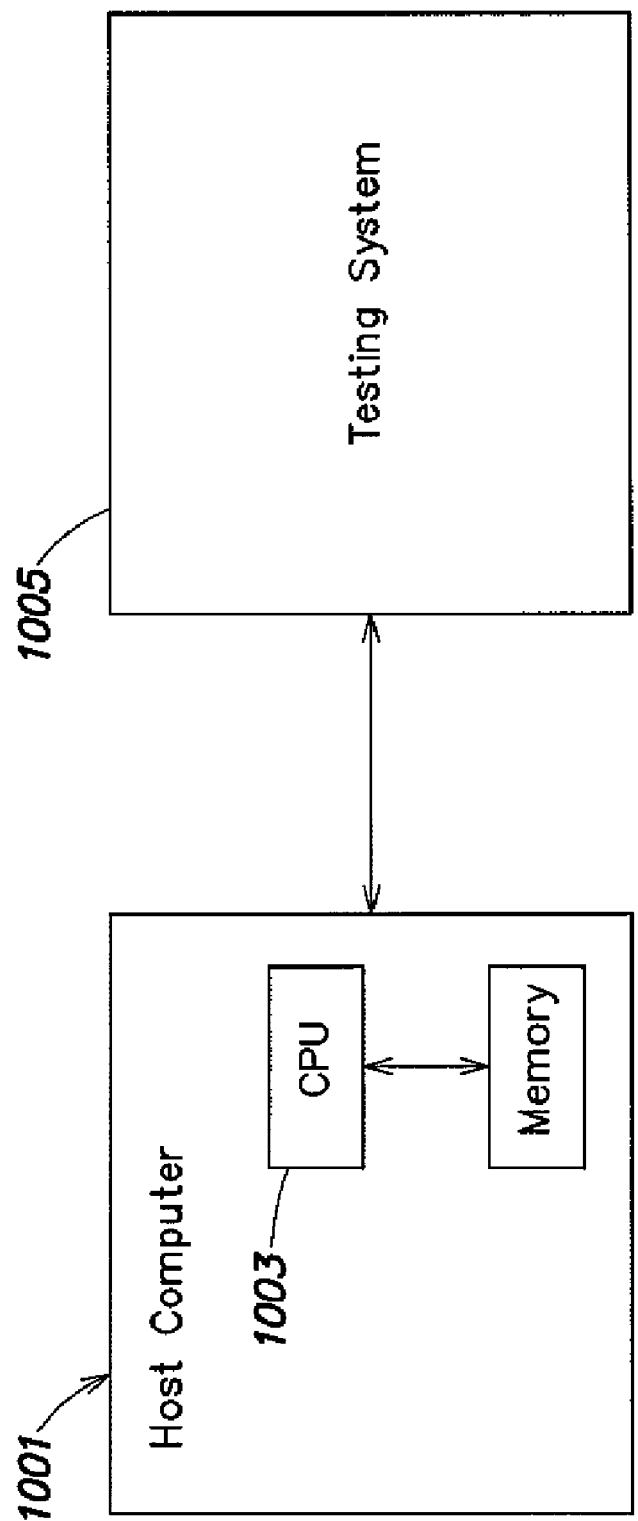
FIG. 10 is a block diagram of an illustrative computer system upon which some embodiments of the invention may be implemented.

Some embodiments of the invention may be implemented using two separate systems. For example, as shown in FIG. 10, embodiments of the invention may be implemented using a host computer 1001 having a central processing unit (CPU) 1003, and a test center 1005. CPU 1003 may be a processor programmed to perform the functions of user interface 301 and business logic 303. In some embodiments host computer 1001 may have multiple CPUs that perform these functions.

Testing system 1005 may perform the functionality of processing and analysis component 305 and frame generator and transmitter 307.

Testing system 1005 may be implemented in any suitable way. For example, in some embodiments, testing system 1005 may be implemented as a chassis having one or more general purpose processors and one or more printed circuit boards that serve as one or more frame generators and transmitters. The one or more general purpose CPUs may perform the functionality of processing and analysis component 305. In some embodiments, each printed circuit board may include hardware (e.g. one or more programmable gate arrays, such as a field programmable gate array (FPGA)) that performs the functionality of frame generator and transmitter 307.

Figure 11:
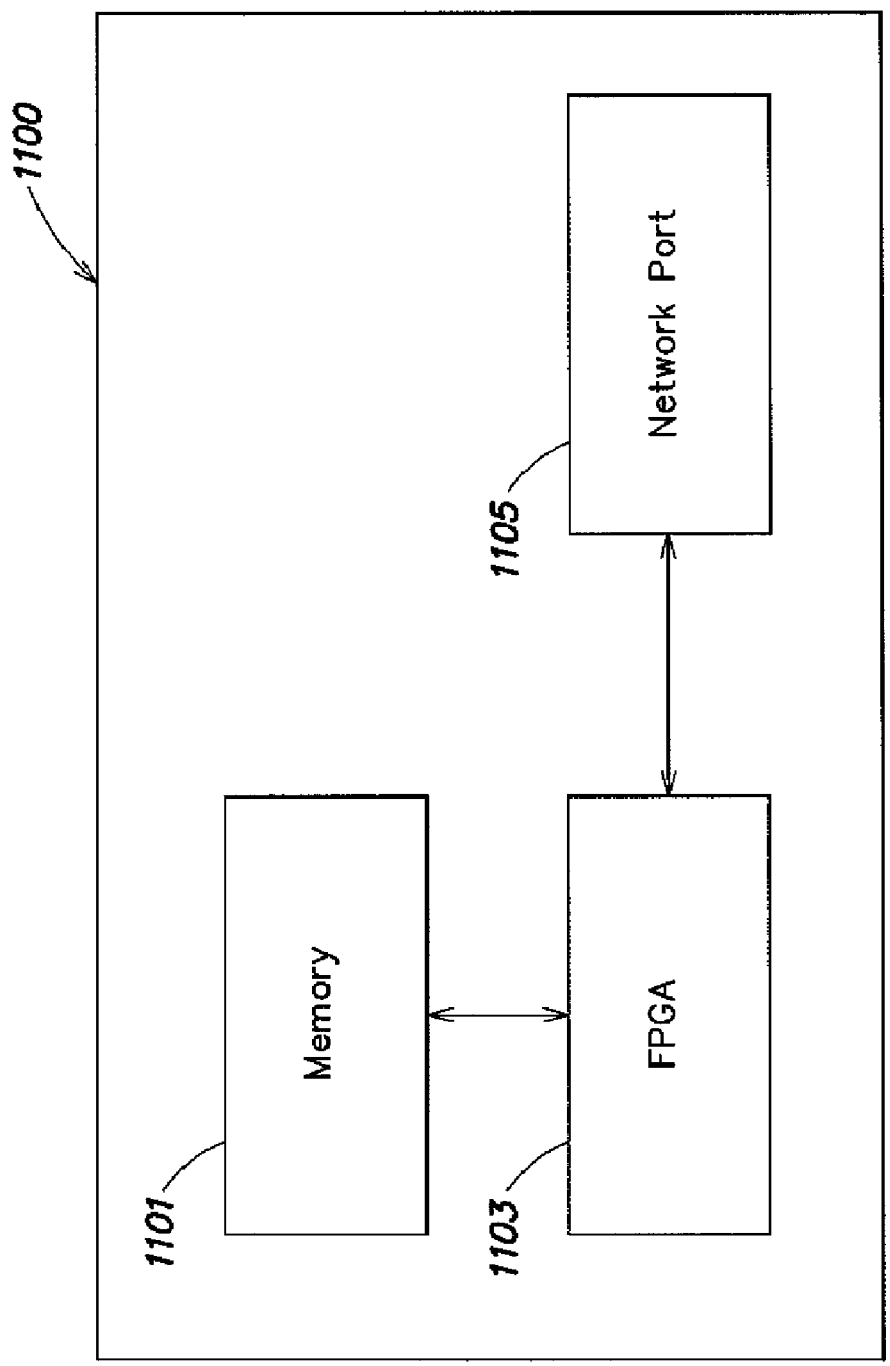
FIG. 11 is a block diagram of an illustrative printed circuit board of a testing system in which some embodiments of the invention my be implemented.

FIG. 11 is a block diagram an example of an example of a printed circuit board suitable for use as a frame generator and transmitter in some embodiments of the invention. In FIG. 11, printed circuit board 1100 includes a memory, an FPGA 1103, and a network port 1105. Memory 1101 may be used to store information used in generating frames (e.g., a frame sequence table and a frame template table). Memory 1101 may be any suitable type of memory as the invention is not limited in this respect. For example, memory 1101 may be either a volatile memory or a non-volatile memory, and may be implemented in any suitable way (e.g., as RAM, magnetic storage, optical storage, flash memory, or in any other suitable way).

FPGA 1103 may access memory 1101 to determine the transmit time for each frame and generate the appropriate frame. FPGA 1103 may transmit the generated frames at the appropriate time via network port 1105. Network port 1105 may be coupled to a network or network device under test (e.g., via a network cable or in any other suitable way).

In the example of FIG. 11, memory 1101 that stores the information used in generating frames (e.g., a frame sequence table and a frame template table) is located on printed circuit board 1100. However, the invention is not limited in this respect, as memory 1101 may be external to printed circuit board 1100 and may be located in any suitable place in testing system 1005, as the invention is not limited in this respect.

Figure 12:
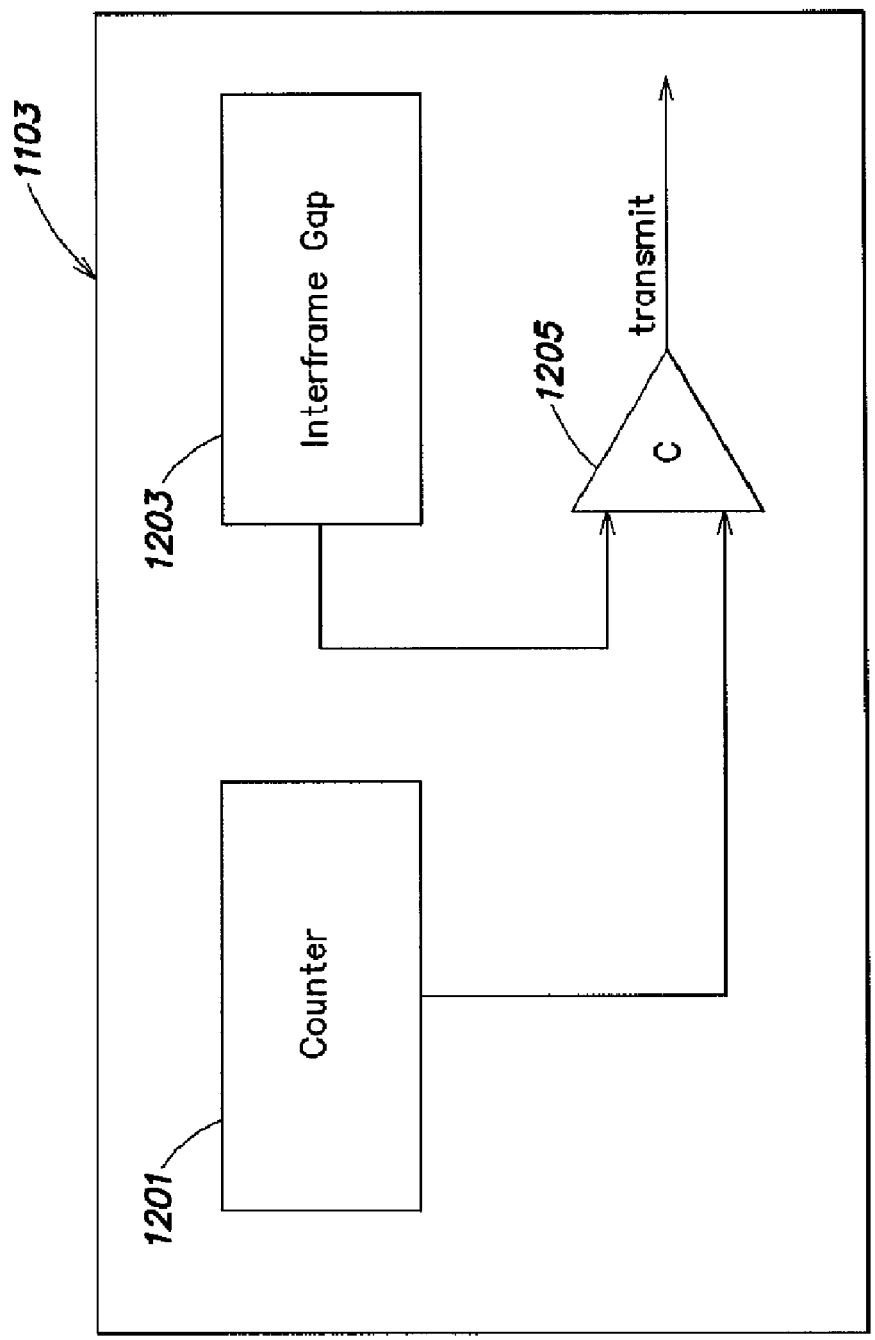
FIG. 12 is a schematic diagram of illustrative circuitry in an field programmable gate array for determining a relative transmit time for frames in a frame sequence, in accordance with one embodiment.

FIG. 12 is an illustrative schematic diagram showing circuitry within FPGA 1103 that may be used determine when to transmit a next frame, in some embodiments. In FIG. 12, FPGA 1103 includes a counter register 1201, an interframe gap register 1203, and a comparator 1205. Register 1203 stores the interframe gap of the most recently transmitted frame. FPGA 1103 may update register 1203 after each frame is transmitted (e.g., using information from the frame sequence table) to store the interframe gap of the most recently transmitted frame. Counter 1201 is a register that counts bytes up from zero starting when a frame completes transmission. Comparator 1205 compares the values in register 1201 with the values in register 1203 and, when they are equal (i.e., the interframe gap has expired), outputs a transmit signal which causes transmission of the next frame to begin.

It should be appreciated that the diagram in FIG. 12 is only one example of circuitry that can be used to determine a next frame transmit time in some embodiments, as the invention is not limited in this respect. Indeed, FPGA 1103 may determine such a transmit time in any suitable way, as the invention is not limited in this respect. For example, in some embodiments, counter 1201 may count up continuously (e.g., without being reset after each transmission) and register 1203 may be loaded after the transmission of a frame by determining the sum of the value in register 1201 and the interframe gap of the most recently transmitted frame, and loading that sum into register 1201.

In the example of FIG. 11, printed circuit board includes a single FPGA and single network port. It should be appreciated that an FPGA is only one example of hardware that may be used in generating and transmitting frames, and the invention is not limited to any particular hardware for performing these functions. For example, in some embodiments an application specific integrated circuit (ASIC) could be used by itself or in combination with an FPGA. In some embodiments, these functions may be performed in software executing on a general purpose processor, or may be performed using a combination of software executing on a general purpose processor and specialized hardware (e.g., an ASIC and/or FPGA).

In embodiments in which an FPGA is used, printed circuit board may include any suitable number of FPGAs and any suitable number of network ports. Indeed, in some embodiments, a printed circuit board may have an FPGA for each data link type over which it is desired to transmit. For example, a printed circuit board may have an FPGA that generates 1 Gb Ethernet traffic and another FPGA that generates 10 Gb Ethernet traffic. In addition, in some embodiments, the printed circuit board may have a separate network port for each FPGA.

As discussed above, testing system 1005 may have multiple printed circuit boards. Any suitable number of printed circuit boards may be used, as the invention is not limited in this respect. In some embodiments, each printed circuit board may be used for generating a different type of network traffic. For example, one printed circuit board may be used to generate Ethernet traffic, one printed circuit board may be used to generate Token Ring traffic, and one printed circuit board may be used to generate IEEE 802.3 traffic. In some embodiments, testing system 1005 may be configurable, such that printed circuit boards can be added and/or removed depending on what type(s) of simulated network traffic it is desired to generate.

In the illustrative embodiments discussed above, testing system 1005 is described as having one or more general purpose processors that perform the functionality of processing and analysis component 305, and that are separate from the printed circuit boards that are used to generate and transmit network traffic. However, the invention is not limited to having these processors separate from the printed circuit boards, as in some embodiments, some or all of the printed circuit boards may include one or more general purpose processors that perform the functionality of processing and analysis component 305.

Further, in the example implementation discussed above, the functionality of user interface 301 and business logic 303 is performed on host computer 1001, while the functionality of processing and analysis component 305 and frame generator and transmitter 307 is performed on testing system 1005. However, the invention is not limited in this respect, as the functionality of these components may be performed on any suitable system in any suitable way. For example, in some embodiments, host computer 101 may perform the functionality of user interface 301, while testing system 1005 performs the functionality of business logic 303, processing and analysis component 305, and frame generator and transmitter 307. In other embodiments, testing system 1005 performs the functionality of all of these components.

It should be appreciated that the above-discussed illustrative implementations are merely examples of some possible implementations of some embodiments, and the invention is not limited to any particular implementation. Rather, the functionality of the embodiments described above may be performed in any suitable way using any suitable hardware, software, or any combination thereof.

As discussed above, some embodiments are directed to simulating network traffic from multiple periodic sources with differing periods (some of which use multi-frame bursts), as from normal non-periodic Internet traffic sources. Different embodiments of the invention use different techniques to accomplish this objective. However, not every embodiment accomplishes this objective and the invention is not limited to accomplishing this or any other specific objective. Further, while some embodiments address some of the above-discussed drawbacks of prior art systems (and some embodiments address all of these drawbacks), not every embodiment addresses all of these drawbacks and some embodiments may not address any of these drawbacks. Indeed, the invention is not limited to addressing all or any of the drawbacks of prior art systems.

The phraseology and terminology used herein is for the purpose of description and should not be regarded as limiting. The use of "including," "comprising," "having," "containing," "involving," and variations thereof, is meant to encompass the items listed thereafter and additional items.

Having described several embodiments of the invention in detail, various modifications and improvements will readily occur to those skilled in the art. Such modifications and improvements are intended to be within the spirit and scope of the invention. Accordingly, the foregoing description is by way of example only, and is not intended as limiting. The invention is limited only as defined by the following claims and the equivalents thereto.

What is claimed is:

1. A method of processing information at a network testing device, the method comprising acts of:
   receiving, at the network testing device, a specification of a sequence of frames in a data stream to be transmitted from the network testing device, wherein the specification specifies at least two frames including a first frame and a second frame, and wherein the specification specifies a first interframe gap associated with the first frame and a second interframe gap, having a different length from the first interframe gap, associated with the second frame, wherein the first interframe gap specified in the specification is specific to the first frame and the second interframe gap specified in the specification is specific to the second frame, wherein the interframe gap associated with the first frame is different from the interframe gap associated with the prior frame; and
   storing the specification;
   determining a length of the sequence of frames stored by a frame sequence table and generated from the frame sequence table by a first simulated traffic source set and a second simulated traffic source set, by selecting among first integer multiples of a least common multiple of periods of the first simulated traffic source set, based on absolute difference sums of the first integer multiples, each of the absolute difference sums including a total of absolute differences between (i) a particular one of the first integer multiples and (ii) second integer multiples of periods of the second traffic source set;
   generating, at the network testing device, the first frame and the second frame to simulate different traffic sources; and
   sending, from the network testing device, the first frame and the second frame generated to simulate the different traffic sources.

2. The method of claim 1, further comprising an act of:
   receiving, at the network testing device, frame template information usable to generate frames specified in the specification of the sequence of frames.

3. The method of claim 2, wherein the specification of the sequence of frames specifies, for each of the at least two frames, a portion of the frame template information usable to generate the respective frame.

4. The method of claim 1, wherein the specification of the sequence of frames specifies a repeat count for each of the at least two frames, indicating for each of the at least two frames how many instances of each frame are to be generated.

5. The method of claim 1, wherein the first frame simulates a frame of a multi-frame burst traffic source.

6. The method of claim 1, wherein the first frame simulates a frame of a first periodic traffic source having a first period, wherein the second frame simulates a frame of a second periodic traffic source having a second period, and wherein the second period is not an integer multiple of the first period and the first period is not an integer multiple of the second period.

7. The method of claim 1, wherein the sequence of frames simulates network traffic from multiple periodic sources with differing periods.

8. The method of claim 1, wherein the sequence of frames simulates network traffic from at least one periodic source and at least one non-periodic source.

9. A method of generating simulated network traffic at a network testing device, the method comprising acts of:
   generating, based on a specification of a sequence of frames to be transmitted, a first frame;
   determining a length of the sequence of frames stored by a frame sequence table and generated from the frame sequence table by a first simulated traffic source set and a second simulated traffic source set, by selecting among first integer multiples of a least common multiple of periods of the first simulated traffic source set, based on absolute difference sums of the first integer multiples, each of the absolute difference sums including a total of absolute differences between (i) a particular one of the first integer multiples and (ii) second integer multiples of periods of the second traffic source set;
   determining, based on the specification, a transmit time for the first frame, wherein the act of determining a transmit time for the first frame comprises determining the transmit time for the first frame based upon an interframe gap associated with a prior frame transmitted prior to the first frame, and wherein the interframe gap associated with the prior frame is specific to the prior frame;
   transmitting the frame at the transmit time for the first frame;
   in response to transmitting the first frame, determining, based on the specification, a transmit time for a next frame in the sequence of frames to be transmitted after the first frame, wherein the act of determining the transmit time for the next frame further comprises determining the transmit time for the first frame based upon an interframe gap associated with the first frame, and wherein the interframe gap associated with the first frame is specific to the first frame, wherein the interframe gap associated with the first frame is different from the interframe gap associated with the prior frame;
   generating, based on the specification, the next frame; and
   transmitting the next frame at the transmit time for the next frame, wherein the network testing device simulates different traffic sources by varying the interframe gap of the sequence of frames.

10. The method of claim 9, wherein the interframe gap associated with the prior frame is specified in the specification, and wherein the interframe gap associated with the first frame is specified in the specification.

11. The method of claim 9, wherein the act of determining the transmit time of the first frame further comprises comparing the interframe gap of the prior frame with the value of a counter register.

12. The method of claim 11, wherein the counter register counts up from the end of transmission of the prior frame.

13. The method of claim 9, wherein the act of generating the first frame further comprises an act of:
using the specification to select a frame template to use in generating the first frame; and
using the frame template to generate the first frame.

14. The method of claim 9, wherein the sequence of frames simulates network traffic from multiple periodic sources with differing periods.

15. The method of claim 9, wherein the sequence of frames simulates network traffic from at least one periodic source and at least one non-periodic source.

16. A device comprising:
a memory that stores a specification of sequence of frames to be transmitted from the device, wherein the specification specifies at least two frames including a first frame and a second frame, and wherein the specification specifies for each of a plurality of frames in the sequence, a value indicative of a relative transmit time of a next frame in the sequence, wherein the specified value for each of the plurality of frames is specific to the one of the plurality of frames for which it is specified, wherein the specified value is variable in the sequence,
a network testing device simulates different traffic sources by varying the relative transmit time of the plurality of frames, and
the memory also storing a frame sequence table, a length of the sequence of frames stored by the frame sequence table and generated from the frame sequence table by a first simulated traffic source set and a second simulated traffic source set determined, by selecting among first integer multiples of a least common multiple of periods of the first simulated traffic source set, based on absolute difference sums of the first integer multiples, each of the absolute difference sums including a total of absolute differences between (i) a particular one of the first integer multiples and (ii) second integer multiples of periods of the second traffic source set.

17. The device of claim 16, wherein the value specified for each of the plurality of frames in the sequence that is indicative of a relative transmit time of a next frame in the sequence is an interframe gap value that specifies an interframe gap to follow transmission of the respective frame.

18. The device of claim 16, further comprising:
a first circuit configured to store a value indicating a transmission of a first frame;
a second circuit configured to transmit a frame at the time indicated by the value in the first circuit;
a third circuit configured to, after transmission of a frame, provide a transmit time value to the first circuit based on the value indicative of a transmit time of a next frame associated with the frame in the specification.

19. The device of claim 16, wherein the sequence of frames simulates network traffic from multiple periodic sources with differing periods.

20. The device of claim 16, wherein the sequence of frames simulates network traffic from at least one periodic source and at least one non-periodic source.

21. A method of transmitting multi-frame burst traffic from a network testing device, the method comprising an act of:
determining a length of a sequence of frames stored by a frame sequence table and generated from the frame sequence table by a first simulated traffic source set and a second simulated traffic source set, by selecting among first integer multiples of a least common multiple of periods of the first simulated traffic source set, based on absolute difference sums of the first integer multiples, each of the absolute difference sums including a total of absolute differences between (i) a particular one of the first integer multiples and (ii) second integer multiples of periods of the second traffic source set; and
transmitting, from the network testing device to the network device under test, a series of multi-frame bursts, wherein the frames in each of the multi-frame bursts are separated by intra-burst intervals, wherein multi-frame bursts in the series of multi-frame bursts are separated by a inter-burst interval, and wherein the intra-burst interval is different in length from the inter-burst interval, wherein the inter-burst value is variable in the series, wherein the network testing device simulates different traffic sources by varying the inter-burst interval of the multi-frame bursts.

22. The method of claim 21, further comprising acts of:
transmitting idle bits during the intra-burst intervals; and
transmitting idle bits during the inter-burst intervals.

23. The method of claim 21, further comprising an act of:
transmitting at least one frame during at least one of the inter-burst intervals.

24. The method of claim 21, wherein generation of the series of multi-frame bursts is not initiated by an application program that generates data to be transmitted over a network.

25. The device of claim 16, wherein the series simulates network traffic from multiple periodic sources with differing periods.

26. The device of claim 21, wherein the series simulates network traffic from at least one periodic source and at least one non-periodic source.

* * * * *